United States Patent
Takizawa

(10) Patent No.: US 7,548,292 B2
(45) Date of Patent: *Jun. 16, 2009

(54) ELECTROOPTICAL DEVICE SUBSTRATE, ELECTROOPTICAL DEVICE, METHODS FOR FABRICATING ELECTROOPTICAL DEVICE SUBSTRATE AND ELECTROOPTICAL DEVICE, ELECTRONIC APPARATUS, AND METHOD FOR TUNING COLOR OF COLOR FILTER

(75) Inventor: Keiji Takizawa, Nagano-ken (JP)

(73) Assignee: Seiko Epson Corporation (JP)

( * ) Notice: Subject to any disclaimer, the term of this patent is extended or adjusted under 35 U.S.C. 154(b) by 597 days.

This patent is subject to a terminal disclaimer.

(21) Appl. No.: 11/146,186

(22) Filed: Jun. 6, 2005

(65) Prior Publication Data

US 2005/0225700 A1 Oct. 13, 2005

Related U.S. Application Data

(62) Division of application No. 10/256,284, filed on Sep. 26, 2002, now Pat. No. 6,927,813.

(30) Foreign Application Priority Data

| Sep. 27, 2001 | (JP) | .............................. 2001-296480 |
| Jul. 26, 2002 | (JP) | .............................. 2002-217915 |

(51) Int. Cl.
*G02F 1/1335* (2006.01)

(52) U.S. Cl. ...................................... 349/106; 349/114

(58) Field of Classification Search ......... 349/113–114, 349/106–109
See application file for complete search history.

(56) References Cited

U.S. PATENT DOCUMENTS

| 5,680,188 | A | 10/1997 | Yoshida et al. |
| 6,476,899 | B2 | 11/2002 | Ishida et al. |
| 6,697,135 | B1 | 2/2004 | Baek et al. |
| 6,785,068 | B2 * | 8/2004 | Takizawa et al. ............ 359/885 |
| 6,927,813 | B2 * | 8/2005 | Takizawa .................... 349/106 |

FOREIGN PATENT DOCUMENTS

| JP | 11-052366 | 2/1999 |
| JP | 2000-267077 | 9/2000 |
| JP | 2000-298271 | 10/2000 |
| JP | 2001-033778 | 2/2001 |
| JP | 2001-125094 | 5/2001 |

\* cited by examiner

*Primary Examiner*—Dung T Nguyen
(74) *Attorney, Agent, or Firm*—Harness, Dickey & Pierce, P.L.C.

(57) ABSTRACT

A substrate 201 has a reflective layer 211 thereon having apertures 211a, and the reflective layer has a color filter 212 thereon having coloring layers 212r, 212g, 212b. One coloring layer at each pixel has a hyperchromic portion 212c above the corresponding aperture 211a of the reflective layer 211, and a hypochromic portion 212d on the reflective layer 211. There is a region in which no hyperchromic portion 212c is disposed above the corresponding aperture 211a (FIG. 1(A)) or another region in which no hypochromic portion 212d is disposed on the reflective layer 211 (FIG. 1(B)).

7 Claims, 13 Drawing Sheets

ELECTROOPTICAL DEVICE SUBSTRATE, ELECTROOPTICAL DEVICE, METHODS FOR FABRICATING ELECTROOPTICAL DEVICE SUBSTRATE AND ELECTROOPTICAL DEVICE, ELECTRONIC APPARATUS, AND METHOD FOR TUNING COLOR OF COLOR FILTER

RELATED APPLICATIONS

This application is a divisional application of U.S. Ser. No. 10/256,284 filed Sep. 26, 2002 now U.S. Pat. No. 6,927,813 claiming priority to Japanese Patent Application No. 2001-296480 filed Sep. 27, 2001 and Japanese Patent Application No. 2002-217915 filed Jul. 26, 2002 all of which are hereby expressly incorporated by reference herein in their entirety.

BACKGROUND OF THE INVENTION

1. Technical Field of the Invention

The present invention relates to electrooptical device substrates, electrooptical devices, methods for fabricating the electrooptical device substrates and the electrooptical devices, and methods for tuning the colors of color filters, and more particularly, the present invention relates to a structure of a color filter suitable for a transflective electrooptical device.

2. Description of the Related Art

Hitherto, in known transflective liquid crystal display panels, both a reflective display using external light and a transmissive display using illuminating light such as backlight are made visible. All transflective liquid crystal display panels have a reflective layer therein for reflecting external light and have a structure in which illuminating light such as light from a backlight passes through the reflective layer. Some reflective layers of this type have a pattern in which one aperture (one slit), having a predetermined ratio, is provided at each pixel of the liquid crystal display panel.

FIG. 11 is a schematic sectional view illustrating the schematic structure of a known transflective liquid crystal display panel 100. The liquid crystal display panel 100 has a structure in which a substrate 101 and a substrate 102 are bonded to each other with sealing adhesive 103 and liquid crystal 104 is injected between the substrates 101 and 102.

The substrate 101 has a reflective layer 111, having one aperture 111a at each pixel, formed on the inner surface thereof, and the reflective layer 111 has a color filter 112, having coloring layers 112r, 112g, and 112b and an overcoat film 112p, formed thereon. The overcoat film 112p on the color filter 112 has transparent electrodes 113 formed on the surface thereof.

On the other hand, the substrate 102 has transparent electrodes 121 formed on the inner surface thereof so as to be orthogonal with the transparent electrodes 113 on the substrate 101 which faces the substrate 102. The transparent electrodes 113 above the substrate 101 and transparent electrodes 121 above the substrate 102 have an alignment film and a hard transparent film formed thereon, as required.

Also, the substrate 102 has a retardation film (¼-wave film) 105 and a polarizer 106 sequentially disposed on the outer surface thereof, and the substrate 101 has a retardation film (¼-wave film) 107 and a polarizer 108 sequentially disposed on the outer surface thereof.

When the liquid crystal display panel 100 having the structure as described above is installed in an electronic apparatus such a portable phone or a portable information terminal, the electronic apparatus has a backlight 109 behind the liquid crystal display panel 100. In the liquid crystal display panel 100, during the daytime or in a well-lit place, e.g., in a building, the reflective display is visible since external light is reflected off the reflective layer 111 after passing through the liquid crystal 104, again passes through the liquid crystal 104, and is emitted from the liquid crystal display panel 100 along a reflecting path R. On the other hand, at night-time or in a dark area, e.g., in the open air, by illuminating the backlight 109, the transmissive display is visible since, after passing through the apertures 111a, a part of the illuminating light from the backlight 109 passes through the liquid crystal display panel 100 and is then emitted from the liquid crystal display panel 100 along a transmitting path T.

However, when the color of the liquid crystal display is to be tuned in the foregoing known liquid crystal panel, it is required to prepare photosensitive agents in which the amounts of colorants such as pigments are finely adjusted in order to achieve the desired display color, thereby increasing the material cost and requiring a lot of work for preparing the photosensitive agents. In particular, in the foregoing transflective liquid crystal display panel, since the colors of the transmissive display and the reflective display are different from each other, optimizing the colors of the transmissive display and the reflective display at the same time is impossible. Accordingly, the display colors are set in a moderately compromised manner, thereby giving rise to problems in that improving the display quality of the liquid crystal display panel is difficult and that the foregoing tuning work of the color becomes troublesome burden when the liquid crystal display panel is fabricated.

Also, since light traveling along the transmitting path T passes through the color filter 112 only once while light traveling along the reflecting path R passes through the color filter 112 twice, that is, in both directions, the chroma of the transmissive display is inferior to that of the reflective display. More particularly, since the brightness of the reflective display generally tends to be insufficient, it is necessary to set the color filter 112 so as to have a high light transmission in order to maintain the brightness thereof; however, this arrangement causes the transmissive display to have an insufficient chroma. Moreover, as described above, the number of times the light passes through the color filter in the reflective display is different from that in the transmissive display, and thus the perceived color of the reflective display is dramatically different from that of transmissive display, thereby detracting from the appearance.

Accordingly, the present invention is made so as to solve the foregoing problems. An object of the present invention is to provide a method and a structure in which the color of the color filter can be easily and finely tuned at low cost. Another object of the present invention is to provide an electrooptical device substrate and a transflective electrooptical device which can maintain sufficient brightness of the reflective display and sufficient chroma of the transmissive display at the same time when a display device capable of performing reflective display and transmissive display at the same time is used. Still another object of the present invention is to achieve a display technology which can reduce the difference in the perceived color between the reflective display and the transmissive display.

SUMMARY OF THE INVENTION

In order to solve the foregoing problems, in an electrooptical device substrate and an electrooptical device, and by methods for fabricating them according to the present invention, coloring layers, each having a hypochromic portion and a hyperchromic portion having a higher light density than the hypochromic portion, and a reflective layer including apertures are formed, wherein the hypochromic portion is disposed so as to two-dimensionally overlap the reflective layer and the hyperchromic portion is disposed so as to two-dimensionally overlap the corresponding aperture. With this structure, in the coloring layer having the hypochromic portion and the hyperchromic portion, since the hyperchromic portion is disposed at least above the corresponding aperture of the reflective layer, light passing through the corresponding aperture of the reflective layer is transmitted through the hyperchromic portion. Accordingly the chroma of transmitted light can be improved compared to what is possible today, and also the differences in the degrees of both the chroma and the hue between a reflective display and a transmissive display can be reduced.

Now, light density means the capabilities per unit thickness of the colored layer for causing deviation of the wavelength distribution of light, wherein, in the event that the light density is high (great) the color (colorfulness) of the transmitted light is intense, and n the event that the light density is low (small), the color of the transmitted light is weak. In the event that the colored layer contains coloring material such as pigment or dye of the like, this light density normally has a positive correlation with the amount of the coloring material.

In an electrooptical device substrate according to the present invention, for forming coloring layers thereon, each comprising a hypochromic portion and a hyperchromic portion having a higher light density than the hypochromic portion, and for forming a reflective layer, including apertures, thereon, the hypochromic portion is disposed on the reflective layer, the hyperchromic portion is disposed above the corresponding aperture, and there is a region in which no hyperchromic portion is disposed above a part of the corresponding aperture.

In the electrooptical device substrate according to the present invention, since there is a region in which no hyperchromic portion is disposed above a part of the corresponding aperture of the reflective layer, the color of the transmissive display can be tuned in accordance with the ratio of the area of the hyperchromic portion above the corresponding aperture to that of the foregoing region, and thus the level of light modulation can be lowered in comparison to the configuration in which the hyperchromic portion is disposed so as to cover the corresponding whole aperture.

In the electrooptical device substrate according to the present invention, the hypochromic portion is preferably disposed in at least one part of the region. With this configuration, since the level of light modulation can be changed in accordance with the three areas of the hyperchromic portion above the corresponding aperture, the hypochromic portion above the corresponding aperture, and the region in which no coloring layer is disposed above the corresponding aperture, the color of the transmissive display can be more finely tuned.

Also, in another electrooptical device substrate according to the present invention, for forming coloring layers thereon, each comprising a hypochromic portion and a hyperchromic portion having a higher light density than the hypochromic portion, and for forming a reflective layer, including apertures, thereon, the hypochromic portion is disposed on the reflective layer, the hyperchromic portion is disposed above the corresponding aperture, and a part of the hypochromic portion is also disposed above the corresponding aperture.

In the electrooptical device substrate according to the present invention, since a part of the hypochromic portion is disposed above the corresponding aperture, the level of light modulation can be changed in accordance with the three areas of the hyperchromic portion above the corresponding aperture, the hypochromic portion above the corresponding aperture, and the region in which no coloring layer is disposed above the corresponding aperture, the color of the transmissive display can be finely tuned.

Furthermore, in another electrooptical device substrate according to the present invention, for forming coloring layers thereon, each comprising a hypochromic portion and a hyperchromic portion having a higher light density than the hypochromic portion, and for forming a reflective layer, including apertures, thereon, the hyperchromic portion is disposed above the corresponding aperture, the hypochromic portion is disposed on the reflective layer, and there is a region in which no hypochromic portion is disposed on a part of the reflective layer.

In the electrooptical device substrate according to the present invention, since there is a region in which no hypochromic portion is disposed on a part of the reflective layer, the color of the reflective display can be tuned in accordance with the ratio of the area of the hypochromic portion on the reflective layer to that of the foregoing region, and thus the level of light modulation can be lowered in comparison to the configuration in which the hypochromic portion is disposed so as to cover the entire reflective layer.

In the electrooptical device substrate according to the present invention, the hyperchromic portion is preferably disposed in at least one part of the region. With this configuration, since the level of light modulation can be changed in accordance with the three areas of the hypochromic portion on the reflective layer, the hyperchromic portion on the reflective layer, and the region in which no coloring layer is disposed on the reflective layer, the color of the reflective display can be more finely tuned.

Moreover, in another electrooptical device substrate according to the present invention, for forming coloring layers thereon, each comprising a hypochromic portion and a hyperchromic portion having a higher light density than the hypochromic portion, and for forming a reflective layer, including apertures, thereon, the hyperchromic portion is disposed above the corresponding aperture, the hypochromic portion is disposed on the reflective layer, and a part of the hyperchromic portion is also disposed on the reflective layer.

In the electrooptical device substrate according to the present invention, since a part of the hyperchromic portion is disposed on the reflective layer, the level of light modulation can be changed in accordance with the three areas of the hyperchromic portion on the reflective layer, the hypochromic portion on the reflective layer, and the region in which no coloring layer is disposed on the reflective layer, and thus the color of the reflective display can be finely tuned.

In the electrooptical device substrate according to the present invention, at least one part of the hypochromic portion may overlap at least one part of the hyperchromic portion. Since the hypochromic portion and the hyperchromic portion overlap each other, a region in which the coloring layer is not formed because of a gap between the hypochromic portion and the hyperchromic portion is unlikely to be produced, and the level of light modulation in the reflective display or in the transmissive display can be made higher than the configuration in which only the hypochromic portion is disposed on the entire reflective layer or only the hyperchromic portion is disposed above the corresponding whole aperture, thereby allowing the light to be tuned over a wider range.

An electrooptical device according to the present invention comprises an electrooptical layer composed of an electrooptical material; a substrate lying along the electrooptical layer; a reflective layer which includes apertures and which is disposed on the substrate; and coloring layers disposed on the substrate, each coloring layer comprising a hypochromic portion and a hyperchromic portion having a higher light density than the hypochromic portion. The hypochromic portion is disposed on the reflective layer and the hyperchromic portion is disposed above the corresponding aperture. In addition, there is a region in which no hyperchromic portion is disposed above a part of the corresponding aperture.

In the electrooptical device according to the present invention, the hypochromic portion is preferably disposed in at least one part of the region.

Also, another electrooptical device according to the present invention comprises a substrate; coloring layers disposed on the substrate, each coloring layer having a hypochromic portion and a hyperchromic portion having a higher light density than the hypochromic portion; and a reflective layer which includes apertures and which is disposed on the substrate. The hypochromic portion is disposed on the reflective layer and the hyperchromic portion is disposed above the corresponding aperture. In addition, a part of the hypochromic portion is also disposed above the corresponding aperture.

Furthermore, another electrooptical device according to the present invention comprises an electrooptical layer composed of an electrooptical material; a substrate lying along the electrooptical layer; a reflective layer which includes apertures and which is disposed on the substrate; and coloring layers disposed on the substrate, each coloring layer having a hypochromic portion and a hyperchromic portion having a higher light density than the hypochromic portion. The hypochromic portion is disposed on the reflective layer and the hyperchromic portion is disposed above the corresponding aperture. In addition, there is a region in which no hypochromic portion is disposed on a part of the reflective layer.

In the electrooptical device according to the present invention, the hyperchromic portion is preferably disposed in at least one part of the region.

Moreover, another electrooptical device according to the present invention comprises a substrate; coloring layers disposed on the substrate, each coloring layer having a hypochromic portion and a hyperchromic portion having a higher light density than the hypochromic portion; and a reflective layer which includes apertures and which is disposed on the substrate. The hypochromic portion is disposed on the reflective layer and the hyperchromic portion is disposed above the corresponding aperture. In addition, a part of the hyperchromic portion is also disposed on the reflective layer.

In the electrooptical device according to the present invention, preferably at least one part of the hypochromic portion may overlap at least one part of the hyperchromic portion.

Some of other electrooptical devices according to the present invention have a counter substrate disposed so as to oppose the substrate via the electrooptical layer.

Another electrooptical device according to the present invention comprises an electrooptical layer composed of an electrooptical material; a substrate lying along the electrooptical layer; a reflective layer which includes apertures and which is disposed on the substrate; a counter substrate disposed so as to oppose the substrate; and coloring layers disposed on the counter substrate, each coloring layer having a hypochromic portion and a hyperchromic portion having a higher light density than the hypochromic portion. The hypochromic portion is disposed so as to two-dimensionally overlap the reflective layer and the hyperchromic portion is disposed so as to two-dimensionally overlap the corresponding aperture. In addition, there is a region which two-dimensionally overlaps a part of the corresponding aperture and in which no hyperchromic portion is disposed.

In the electrooptical device according to the present invention, preferably the hypochromic portion is also disposed in at least one part of the region.

Also, another electrooptical device according to the present invention comprises a substrate; coloring layers disposed on the substrate, each coloring layer having a hypochromic portion and a hyperchromic portion having a higher light density than the hypochromic portion; and a reflective layer which includes apertures and which is disposed on the substrate. The hypochromic portion is disposed on the reflective layer and the hyperchromic portion is disposed above the corresponding aperture. In addition, a part of the hypochromic portion is disposed so as to two-dimensionally overlap the corresponding aperture.

Furthermore, another electrooptical device according to the present invention comprises an electrooptical layer composed of an electrooptical material; a substrate lying along the electrooptical layer; a reflective layer which includes apertures and which is disposed on the substrate; a counter substrate disposed so as to oppose the substrate; and coloring layers disposed on the counter substrate, each coloring layer having a hypochromic portion and a hyperchromic portion having a higher light density than the hypochromic portion. The hypochromic portion is disposed so as to two-dimensionally overlap the reflective layer, and the hyperchromic portion is disposed so as to two-dimensionally overlap the corresponding aperture. In addition, there is a region which two-dimensionally overlaps a part of the reflective layer and in which no hypochromic portion is disposed.

In the electrooptical device according to the present invention, preferably the hyperchromic portion is also disposed in at least one part of the region.

Moreover, another electrooptical device according to the present invention comprises an electrooptical layer composed of an electrooptical material; a substrate lying along the electrooptical layer; a reflective layer which includes apertures and which is disposed on the substrate; a counter substrate disposed so as to oppose the substrate; and coloring layers disposed on the counter substrate, each coloring layer having a hypochromic portion and a hyperchromic portion having a higher light density than the hypochromic portion. The hypochromic portion is disposed so as to two-dimensionally overlap the reflective layer and the hyperchromic portion is disposed so as to two-dimensionally overlap the corresponding aperture. In addition, a part of the hyperchromic portion is also disposed so as to two-dimensionally overlap the reflective layer.

In the electrooptical device according to the present invention, at least one part of the-hypochromic portion may two-dimensionally overlap at least one part of the hyperchromic portion.

Also, another electrooptical device according to the present invention comprises a pair of substrates; an electrooptical layer which comprises an electrooptical material and which is held between the pair of substrates; a reflective layer which includes apertures and which is disposed between the pair of substrates; a hypochromic layer disposed at each pixel on one of the pair of substrates lying along the electrooptical layer; and a hyperchromic layer which is disposed at each pixel on the other of the pair of substrates and which has a higher light density than the hypochromic layer. The hypochromic layer is disposed so as to two-dimensionally overlap the reflective layer and the hyperchromic layer is disposed so as to two-dimensionally overlap the corresponding aperture. In addition, there is a region which two-dimensionally overlaps a part of the corresponding aperture and in which no hyperchromic layer is disposed.

In the electrooptical device according to the present invention, preferably the hypochromic layer is also disposed so as to overlap at least one part of the region.

Also, another electrooptical device according to the present invention comprises a pair of substrates; an electrooptical layer which comprises an electrooptical material and which is held between the pair of substrates; a reflective layer which includes apertures and which is disposed between the pair of substrates; a hypochromic layer disposed at each pixel on one of the pair of substrates lying along the electrooptical layer; and a hyperchromic layer which is disposed at each pixel on the other of the pair of substrates and which has a higher light density than the hypochromic layer. The hypochromic layer is disposed so as to two-dimensionally overlap the reflective layer and the hyperchromic layer is disposed so as to two-dimensionally overlap the corresponding aperture. In addition, a part of the hypochromic layer is also disposed so as to two-dimensionally overlap the corresponding aperture.

Also, another electrooptical device according to the present invention comprises a pair of substrates; an electrooptical layer which comprises an electrooptical material and which is held between the pair of substrates; a reflective layer which includes apertures and which is disposed between the pair of substrates; a hypochromic layer disposed at each pixel on one of the pair of substrates lying along the electrooptical layer; and a hyperchromic layer which is disposed at each pixel on the other of the pair of substrates and which has a higher light density than the hypochromic layer. The hypochromic layer is disposed so as to two-dimensionally overlap the reflective layer and the hyperchromic layer is disposed so as to two-dimensionally overlap the corresponding aperture. In addition, there is a region which two-dimensionally overlaps a part of the reflective layer and in which no hypochromic layer is disposed.

In the electrooptical device according to the present invention, preferably the hyperchromic layer is also disposed so as to overlap at least one part of the region.

Also, another electrooptical device according to the present invention comprises a pair of substrates; an electrooptical layer which comprises an electrooptical material and which is held between the pair of substrates; a reflective layer which includes apertures and which is disposed between the pair of substrates; a hypochromic layer disposed at each pixel on one of the pair of substrates lying along the electrooptical layer; and a hyperchromic layer which is disposed at each pixel on the other of the pair of substrates and which has a higher light density than the hypochromic layer. The hypochromic layer is disposed so as to two-dimensionally overlap the reflective layer and the hyperchromic layer is disposed so as to two-dimensionally overlap the corresponding aperture. In addition, a part of the hyperchromic layer is also disposed so as to two-dimensionally overlap the reflective layer.

In the electrooptical device according to the present invention, at least one part of the hypochromic layer may two-dimensionally overlap at least one part of the hyperchromic layer.

A method for fabricating an electrooptical device substrate according to the present invention comprises the steps of forming coloring layers on a substrate, each coloring layer having a hypochromic portion and a hyperchromic portion having a higher light density than the hypochromic portion; and forming a reflective layer, including apertures, on the substrate. In the step of forming the coloring layers, the hyperchromic portion is formed so as to two-dimensionally overlap the corresponding aperture, the hypochromic portion is formed so as to two-dimensionally overlap the reflective layer, and a region which overlaps a part of the corresponding aperture and in which no hyperchromic portion is disposed is formed.

In the method for fabricating the electrooptical device substrate according to the present invention, preferably the hypochromic portion is also formed so as to overlap at least one part of the region.

A method for fabricating another electrooptical device substrate according to the present invention comprises the steps of forming coloring layers on a substrate, each coloring layer having a hypochromic portion and a hyperchromic portion having a higher light density than the hypochromic portion; and forming a reflective layer, including apertures, on the substrate. In the step of forming the coloring layers, the hyperchromic portion is formed so as to two-dimensionally overlap the corresponding aperture, the hypochromic portion is formed so as to two-dimensionally overlap the reflective layer, and a part of the hypochromic portion is also formed so as to two-dimensionally overlap the corresponding aperture.

A method for fabricating another electrooptical device substrate according to the present invention comprises the steps of forming coloring layers on a substrate, each coloring layer having a hypochromic portion and a hyperchromic portion having a higher light density than the hypochromic portion; and forming a reflective layer, including apertures, on the substrate. In the step of forming the coloring layers, the hyperchromic portion is formed so as to two-dimensionally overlap the corresponding aperture, the hypochromic portion is formed so as to two-dimensionally overlap the reflective layer, and a region which two-dimensionally overlaps the reflective layer and in which no hypochromic portion is disposed is formed.

In the method for fabricating the electrooptical device substrate according to the present invention, preferably the hyperchromic portion is also formed so as to overlap at least one part of the region.

A method for fabricating another electrooptical device substrate according to the present invention comprises the steps of forming coloring layers on a substrate, each coloring layer having a hypochromic portion and a hyperchromic portion having a higher light density than the hypochromic portion; and forming a reflective layer, including apertures, on the substrate. In the step of forming the coloring layers, the hyperchromic portion is formed so as to two-dimensionally overlap the corresponding aperture, the hypochromic portion is formed so as to two-dimensionally overlap the reflective layer, and a part of the hyperchromic portion is also formed so as to two-dimensionally overlap the reflective layer.

A method for fabricating another electrooptical device according to the present invention comprises the steps of forming coloring layers on a substrate, each coloring layer having a hypochromic portion and a hyperchromic portion having a higher light density than the hypochromic portion; and forming a reflective layer, including apertures, on the substrate or on a counter substrate which opposes the substrate. In the step of forming the coloring layers, the hyperchromic portion is formed so as to two-dimensionally overlap the corresponding aperture, the hypochromic portion is formed so as to two-dimensionally overlap the reflective layer, and a region which two-dimensionally overlaps the corresponding aperture and in which no hyperchromic portion is disposed is formed.

In the method for fabricating the electrooptical device according to the present invention, preferably the hypochromic portion is also formed so as to overlap at least one part of the region.

A method for fabricating another electrooptical device according to the present invention comprises the steps of forming coloring layers on a substrate, each coloring layer having a hypochromic portion and a hyperchromic portion having a higher light density than the hypochromic portion; and forming a reflective layer, including apertures, on the substrate or on a counter substrate which opposes the substrate. In the step of forming the coloring layers, the hyperchromic portion is formed so as to two-dimensionally overlap the corresponding aperture, the hypochromic portion is formed so as to two-dimensionally overlap the reflective layer, and a part of the hypochromic portion is also formed so as to two-dimensionally overlap the corresponding aperture.

A method for fabricating another electrooptical device according to the present invention comprises the steps of forming coloring layers on a substrate, each coloring layer having a hypochromic portion and a hyperchromic portion having a higher light density than the hypochromic portion; and forming a reflective layer, including apertures, on the substrate or on a counter substrate which opposes the substrate. In the step of forming the coloring layers, the hyperchromic portion is formed so as to two-dimensionally overlap the corresponding aperture, the hypochromic portion is formed so as to two-dimensionally overlap the reflective layer, and a region which two-dimensionally overlaps the reflective layer and in which no hypochromic portion is disposed is formed.

In the method for fabricating the electrooptical device according to the present invention, preferably the hyperchromic portion is also formed so as to overlap at least one part of the region.

A method for fabricating another electrooptical device according to the present invention comprises the steps of forming coloring layers on a substrate, each coloring layer having a hypochromic portion and a hyperchromic portion having a higher light density than the hypochromic portion; and forming a reflective layer, including apertures, on the substrate or on a counter substrate which opposes the substrate. In the step of forming the coloring layers, the hyperchromic portion is formed so as to two-dimensionally overlap the corresponding aperture, the hypochromic portion is formed so as to two-dimensionally overlap the reflective layer, and a part of the hyperchromic portion is also formed so as to two-dimensionally overlap the reflective layer.

A method for fabricating another electrooptical device according to the present invention, having an electrooptical layer which is composed of an electrooptical material and which is held between a pair of substrates, comprises the steps of forming a reflective layer, including apertures, between the pair of substrates; forming a hypochromic layer at each pixel on one of the pair of substrates; and forming a hyperchromic layer, having a higher light density than the hypochromic layer, at each pixel on the other of the pair of substrates. In the step of forming the hypochromic layer, the hypochromic layer is formed so as to two-dimensionally overlap the reflective layer. In the step of forming the hyperchromic layer, the hyperchromic layer is formed so as to two-dimensionally overlap the corresponding aperture, and a region which two-dimensionally overlaps a part of the corresponding aperture and in which no hyperchromic layer is disposed is formed.

In the method for fabricating the electrooptical device according to the present invention, preferably the hyperchromic layer is also formed so as to overlap at least one part of the region.

A method for fabricating another electrooptical device according to the present invention, having an electrooptical layer which is composed of an electrooptical material and which is held between a pair of substrates, comprises the steps of forming a reflective layer, including apertures, between the pair of substrates; forming a hypochromic layer at each pixel on one of the pair of substrates; and forming a hyperchromic layer, having a higher light density than the hypochromic layer, at each pixel on the other of the pair of substrates. In the step of forming the hypochromic layer, the hypochromic layer is formed so as to two-dimensionally overlap the reflective layer, and a part of the hypochromic layer is formed so as to two-dimensionally overlap the corresponding aperture. In the step of forming the hyperchromic layer, the hyperchromic layer is formed so as to two-dimensionally overlap the corresponding aperture.

A method for fabricating another electrooptical device according to the present invention, having an electrooptical layer which is composed of an electrooptical material and which is held between a pair of substrates, comprises the steps of forming a reflective layer, including apertures, between the pair of substrates; forming a hypochromic layer at each pixel on one of the pair of substrates; and forming a hyperchromic layer, having a higher light density than the hypochromic layer, at each pixel on the other of the pair of substrates. In the step of forming the hypochromic layer, the hypochromic layer is formed so as to two-dimensionally overlap the reflective layer, and a region which two-dimensionally overlap the reflective layer and in which no hypochromic layer is disposed is formed. In the step of forming the hyperchromic layer, the hyperchromic layer is formed so as to two-dimensionally overlap the corresponding aperture.

In the method for fabricating the electrooptical device according to the present invention, preferably the hyperchromic layer is also formed so as to overlap at least one part of the region.

A method for fabricating another electrooptical device according to the present invention, having an electrooptical layer which is composed of an electrooptical material and which is held between a pair of substrates, comprises the steps of forming a reflective layer, including apertures, between the pair of substrates; forming a hypochromic layer at each pixel on one of the pair of substrates; and forming a hyperchromic layer, having a higher light density than the hypochromic layer, at each pixel on the other of the pair of substrates. In the step of forming the hypochromic layer, the hypochromic layer is formed so as to two-dimensionally overlap the reflective layer. In the step of forming the hyperchromic layer, the hyperchromic layer is formed so as to two-dimensionally overlap the corresponding aperture, and a part of the hyperchromic layer is formed so as to two-dimensionally overlap the reflective layer.

In a method for tuning the color of a color filter according to the present invention, when a hypochromic portion and a hyperchromic portion having a higher light density than the hypochromic portion are provided in each coloring region which is disposed in substantially the same optical state in the color filter, the color of the coloring region is tuned by changing at least one of the areas of the hypochromic portion and the hyperchromic portion in the coloring region.

In the method for tuning the color of a color filter according to the present invention, since both the hypochromic portion and the hyperchromic portion are formed in the coloring region and the color of the coloring region is tuned by changing at least one of the areas of the hypochromic portion and the hyperchromic portion, tuning the color density of the material for forming the coloring layer can be eliminated, and thus a desired color of the color filter is easily obtained at low cost. The foregoing coloring region may have a region in which the hypochromic portion and the hyperchromic portion overlap each other or alternatively a region in which neither the hypochromic portion nor the hyperchromic portion is formed.

In the method for tuning the color of the color filter according to the present invention, when a reflective coloring region which two-dimensionally overlaps a reflective layer and a transmissive coloring region which does not two-dimensionally overlap the reflective layer are formed in the color filter, and the hypochromic portion and the hyperchromic portion are mainly formed in the reflective coloring region and the transmissive coloring region, respectively, the color of at least one of the reflective coloring region and the transmissive coloring region is preferably tuned as the color of the foregoing coloring region. With this method, by tuning the color of at least one of the reflective coloring region and the transmissive coloring region, the color of at least one of the reflective display and the transmissive display can be easily tuned at low cost in a desired manner.

In the foregoing solving means, in order to reduce the difference in color between the reflective display and the transmissive display, the light density of the foregoing hyperchromic portion is preferably about twice that of the hypochromic portion, and is more preferably in a range from 1.4 to 2.6 times that of the hypochromic portion. In particular, in order to reduce the difference in the perceived color between the reflective display and the transmissive display, the light density of the hyperchromic portion is preferably in a range from 1.7 to 2.3 times that of the hypochromic portion. By arranging the optical densities as described above, when the hypochromic portion and the hyperchromic portion in the coloring layer are formed so as to have substantially the same thickness, a filtering effect for the reflected light can be made substantially the same as that for the transmitted light. Also, in the foregoing range of the light density, the difference in color between the reflective display and the transmissive display can be easily reduced by adjusting at least one of the areas of the hypochromic portion (hypochromic layer) and the hyperchromic portion (hyperchromic layer).

Furthermore, in the foregoing solving means, when the color of the transmissive display is emphasized with respect to the reflective display, the light density of the foregoing hyperchromic portion is preferably twice or more that of the hypochromic portion. By arranging the optical densities as describe above, the color of the transmissive display can be improved with respect to the reflective display.

In the foregoing solving means, either a stacked black matrix formed of stacked coloring layers, each representing a different hue, or a black light-shielding layer composed of a black material is sometimes formed in the spaces between the adjacent color filters. When the stacked black matrix is formed, the foregoing hyperchromic layers are desirably used as the plurality of coloring layers representing different hues in order to improve the light-shielding effect thereof.

In the present invention, a reflective layer is defined as the one which has a reflective surface effectively performing the reflecting function. Therefore, even if a reflective layer is formed in practice, it is not included in this invention when it does not effectively perform the reflecting function, for example, by being covered by a light-shielding layer.

DETAILED DESCRIPTION OF THE PREFERRED EMBODIMENTS

Electrooptical device substrates, electrooptical devices, and methods for fabricating the electrooptical device substrates and the electrooptical devices according to embodiments of the present invention will be described in further detail with reference to the accompanying drawings.

First Embodiment

Figure 1:
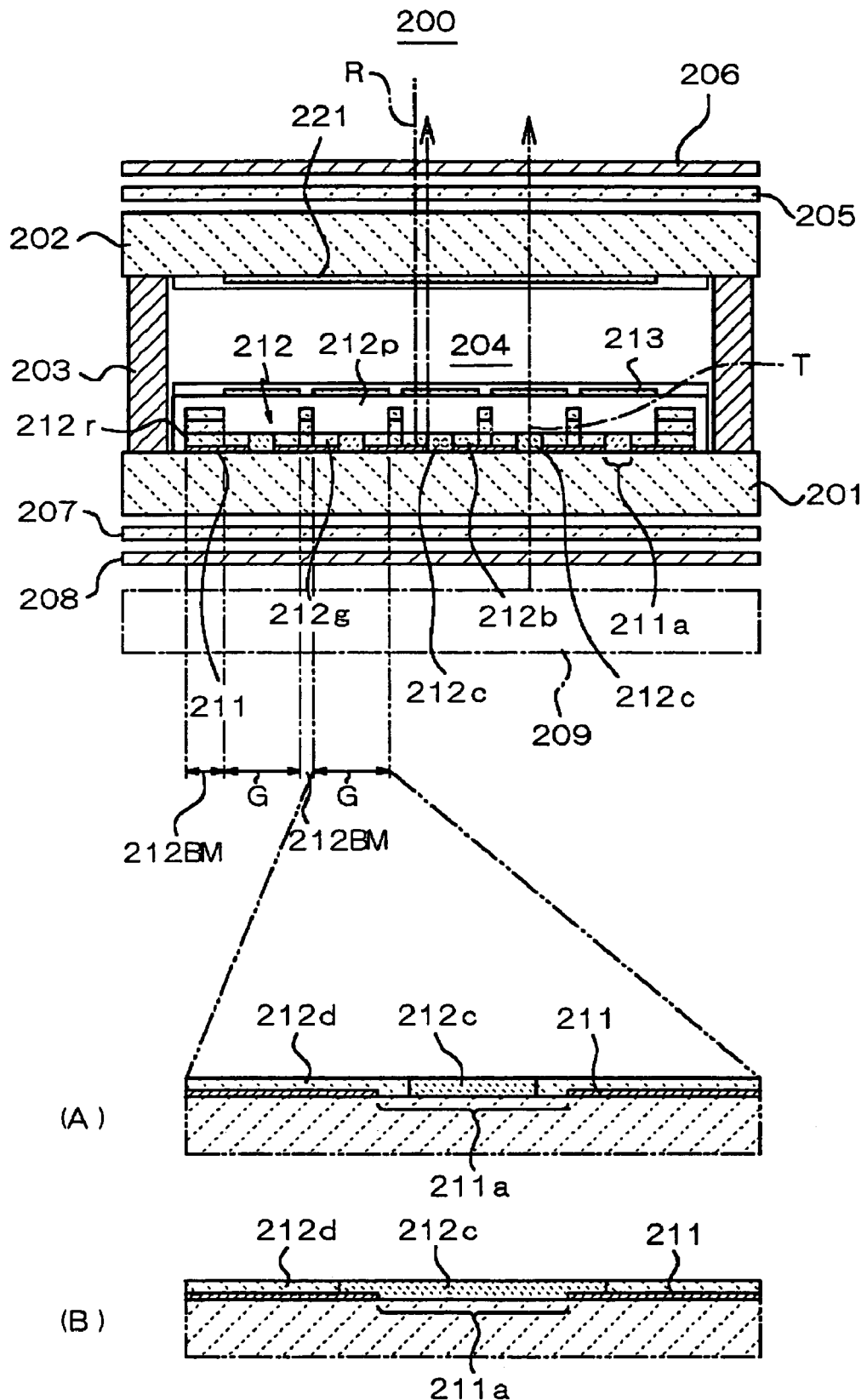
FIG. 1 is a schematic sectional view illustrating the structure of a liquid crystal display according to a first embodiment of the present invention.

FIG. 1 is a schematic sectional view illustrating a substrate 210 which is an electrooptical device substrate according to a first embodiment of the present invention and a liquid crystal display panel 200 of an electrooptical device using the electrooptical device substrate according to the first embodiment.

Figure 11:
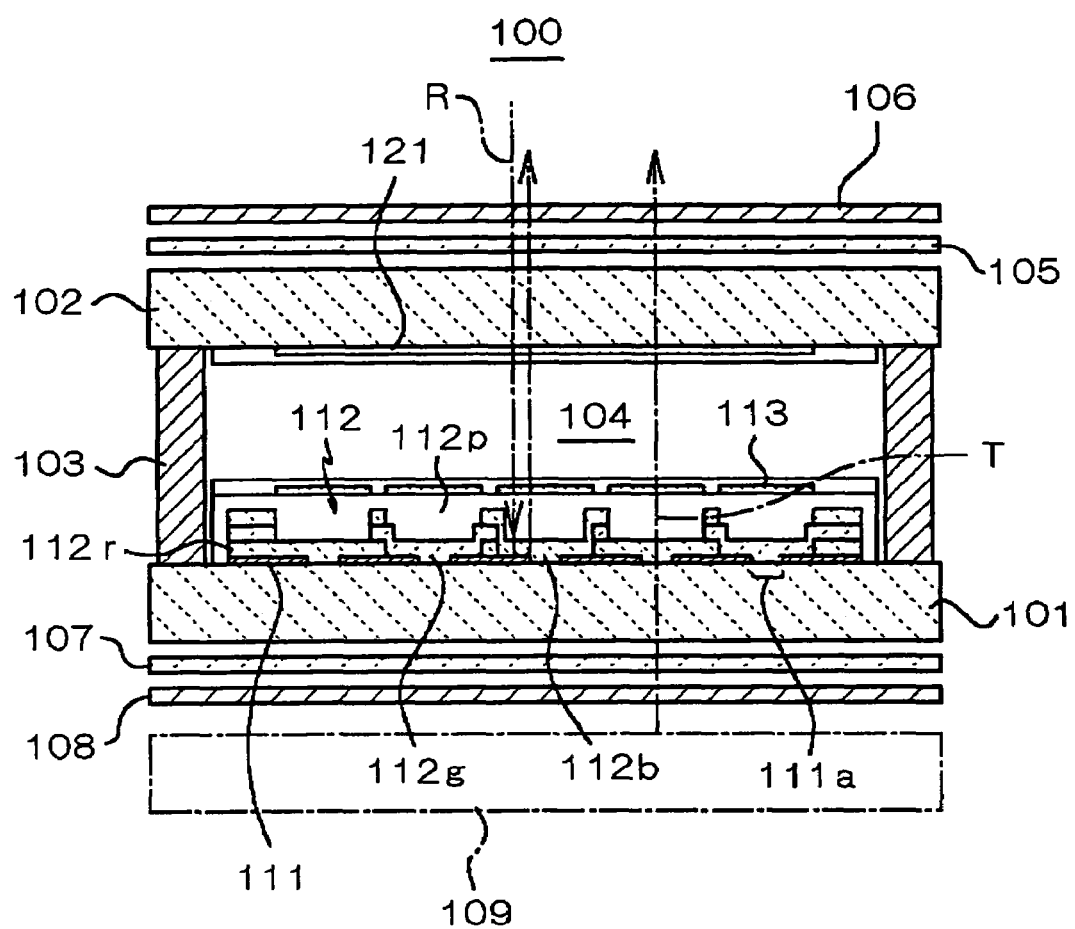
FIG. 11 is a schematic sectional view illustrating the structure of a known transflective liquid crystal display panel.

The liquid crystal display panel 200 is constructed such that the substrate 201 and a substrate 202 composed of glass, plastic, or the like are bonded to each other with sealing adhesive 203, and liquid crystal 204 is injected into the space formed therebetween. Transparent electrodes 221, retardation films 205 and 207, and polarizers 206 and 208 formed on the substrate 202 are completely identical to those of the foregoing known example shown in FIG. 11.

In this embodiment, the substrate 201 has a reflective layer 211, having apertures 211a, formed on the inner surface thereof in the same fashion as the known example. The reflective layer 211 is formed of a thin film composed of aluminum, an aluminum alloy, a silver alloy, or the like. At least one aperture 211a is formed at each of pixels G, which are arranged in a matrix manner on the inner surface of the substrate 201, so as to have a predetermined aperture ratio (e.g., 10 to 30%) with respect to the total area of the corresponding pixel G.

Figure 6:
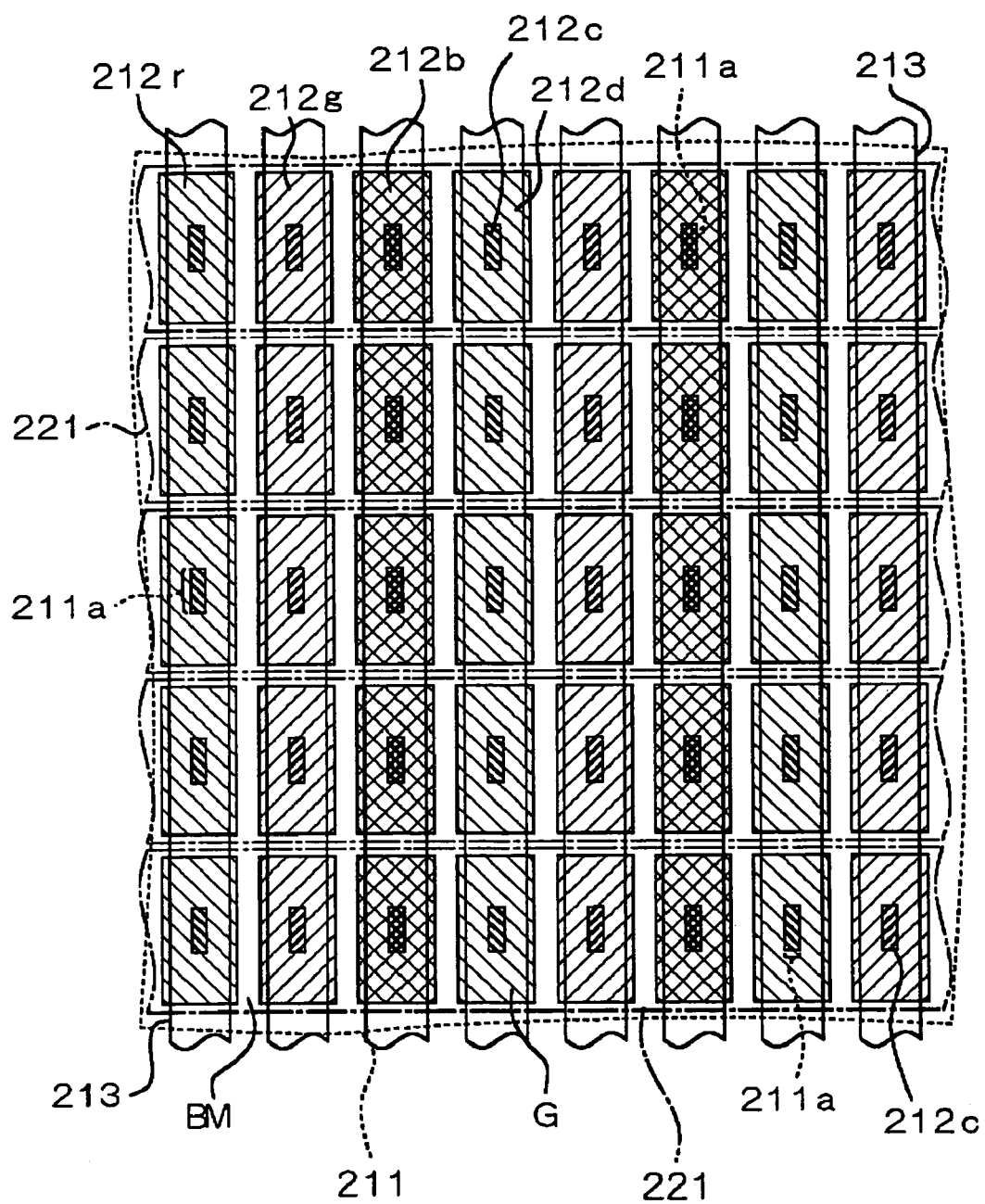
FIG. 6 is a schematic plan view illustrating the two-dimensional structure of an electrooptical device substrate according to the first embodiment.

FIG. 6 is a plan view of the substrate 201 viewed from the above. The apertures 211a are configured so as to have, for example, a rectangular shape in plan view, as indicated by a dotted lead line in FIG. 6, and formed substantially at the center of the pixels G. However, since the positions, the shapes, and the number of the apertures 211a are not limited, a plurality of apertures may be formed at each pixel instead of one aperture formed at each pixel as in this embodiment.

The foregoing reflective layer 211 has coloring layers 212r, 212g, and 212b thereon which consist of three colors, i.e., R (red), G (green), and B (blue), respectively, for example, in the case of a color filter using the primary colors, and which are disposed in an appropriate array pattern such as a known stripe array, delta array (triangle array), or slanted mosaic array (diagonal array), wherein one coloring layer is disposed at each pixel G, (a color filter having a stripe array is shown in FIG. 6). The adjacent pixels G have a stacked black matrix 212BM therebetween formed by stacking together the coloring layers 212r, 212g, and 212b so as to provide a light shielding effect. Each of the coloring layers 212r, 212g, and 212b is basically formed so as to have a substantially flat surface except for the region of the stacked black matrix 212BM.

FIGS. 1(A) and 1(B) are magnified views of the example structures of one pixel. Each of the coloring layers 212r, 212g, and 212b has a hyperchromic portion 212c above the corresponding aperture 211a of the foregoing reflective layer 211 and a hypochromic portion 212d which has a lower light density than the hyperchromic portion 212c and which lies in the coloring layer except for the region where there is the hyperchromic portion 212c. The hyperchromic portion 212c having a high light density is formed so that the density of a colorant, such as a pigment, a dye, or the like, dispersed in, for example, a light-transmissive resin is higher than that in the hypochromic portion 212d.

The foregoing coloring layers 212r, 212g, and 212b and the stacked black matrix 212BM have an overcoat film 212p thereon composed of a transparent resin or the like. The overcoat film 212p is intended to protect the coloring layers from corrosion by or exposure to a chemical substance or the like during the fabrication steps and also to make the surface of a color filter 212 flat.

The color filter 212 has transparent electrodes 213 thereon composed of a transparent conductor such as ITO (indium tin oxide). In this embodiment, the transparent electrodes 213 are formed in a stripe array, that is, the plural transparent electrodes 213 are disposed in parallel to each other. Also, the transparent electrodes 213 extend along a direction orthogonal to the transparent electrodes 221 formed on the foregoing substrate 202 in the same stripe array as the transparent electrodes 213. Each pixel G is formed by one component part of the liquid crystal display panel 200, wherein the component parts are included in the regions where the transparent electrodes 213 and the transparent electrodes 221 overlap (shown by a dotted chain line in FIG. 6), that is, in the foregoing overlapped regions where there are the reflective layer 211, the color filters 212, the transparent electrodes 213, the liquid crystal 204, and the transparent electrodes 221.

In this embodiment, in each of at least one group of the coloring layers 212r, 212g, and 212b, there is a region in which no hyperchromic portion 212c is disposed above the corresponding aperture 211a, as shown in FIG. 1(A); instead, the hypochromic portion 212d is disposed in this region. In other words, a part of the hypochromic portion 212d is disposed above the corresponding aperture 211a. More particularly, the hypochromic portion 212d is formed around the corresponding aperture 211a instead of the hyperchromic portion 212c.

Alternatively, in each of at least one group of the coloring layers 212r, 212g, and 212b, there may be a region in which no hypochromic portion 212d is disposed on the reflective layer 211, as shown in FIG. 1(B); instead, the hyperchromic portion 212c may be disposed in this region. In other words, a part of the hyperchromic portion 212c may also be disposed on the reflective layer 211.

In this embodiment, since the foregoing color filter 212 has the hyperchromic portions 212c, each formed above the corresponding aperture 211a of the reflective layer 211 and having a higher light density than the rest of the corresponding coloring layer, the chroma of light passing through the hyperchromic portion 212c of each of the coloring layers 212r, 212g, and 212b is high and that of light passing through the hypochromic portion 212d lying in the rest of the coloring layer is relatively low.

In the liquid crystal display panel 200, when reflective display is performed, light is transmitted along a reflecting path R and is visible, and when transmissive display is performed, light is transmitted along a transmitting path T and is visible. Although the color filter 212 has the same function for the light transmitted along the reflecting path R as the conventional color filter, since the transmitting path T extends through the corresponding aperture 211a of the reflective layer 211, the transmitted light is transmitted through the hyperchromic portion 212c of each of the coloring layers 212r, 212g, and 212b, and consequently the chroma of the transmissive display is improved in comparison to that of the transmissive display in the conventional liquid crystal display panel shown in FIG. 11.

Thus, in this embodiment, by forming the hyperchromic portions 212c, each in the region two-dimensionally overlapping the corresponding aperture 211a of the reflective layer 211 of the color filter 212, the chroma of the transmissive display can be improved without sacrificing the brightness of the reflective display. In particular, the difference in the perceived color between the reflective display and the transmissive display can be reduced when compared to that in the conventional liquid crystal display panel.

When the hyperchromic portions 212c are as thick as the hypochromic portions 212d, the foregoing hyperchromic portions 212c are preferably configured such that light passing through the hyperchromic portions 212c has substantially the same perceived color as the same light passing through the hypochromic portions 212d which would be twice as thick as the hyperchromic portions 212c. In this specification, it is assumed that the color density of the hyperchromic portions 212c is twice that of the hypochromic portions 212d. More particularly, by using this color density, the color density of the hyperchromic portions 212c is preferably in a range from 1.4 to 2.6 times, and more preferably in a range from 1.7 to 2.3 times that of the hypochromic portions 212d. With this arrangement, the difference in the degree of chroma between the reflective display and the transmissive display can be further reduced, and thus the difference in the perceived color between these two displays can be further reduced.

Also, in this embodiment, each of the coloring layers 212r, 212g, and 212b has the hypochromic portion 212d and the hyperchromic portion 212c two-dimensionally disposed therein, thereby reducing the unevenness in the surface profile (the upper surface profile shown in the figure) of each of the coloring layers 212r, 212g, and 212b. In particular, by making the hypochromic portion 212d as thick as the hyperchromic portion 212c, the flatness of the coloring layers can be improved. Accordingly, the flatness of the color filter 212 can be improved, leading to an improved display quality of the liquid crystal display panel.

Although, in this embodiment, the chroma of the transmissive display is improved while maintaining the brightness of the reflective display to be bright as described above, in general, a color of each display is required to be tuned if necessary in accordance with the setting of an apparatus in which the liquid crystal display panel is installed, the amount of light from a backlight, or the like. For this requirement, a desired color is conventionally achieved by tuning the density of a colorant such as a dye or a pigment contained in a material (a photosensitive resin or the like) of the coloring layer. However, the above-described method of tuning the density of the colorant gives rise to problems in that, since the color can be evaluated as to whether it is desirable or not only when a new material (photosensitive resin) containing a colorant having the tuned density is prepared and then coloring layers are actually fabricated by way of trial, costly materials and a lot of work for the above-described evaluations are needed.

Figure 10:
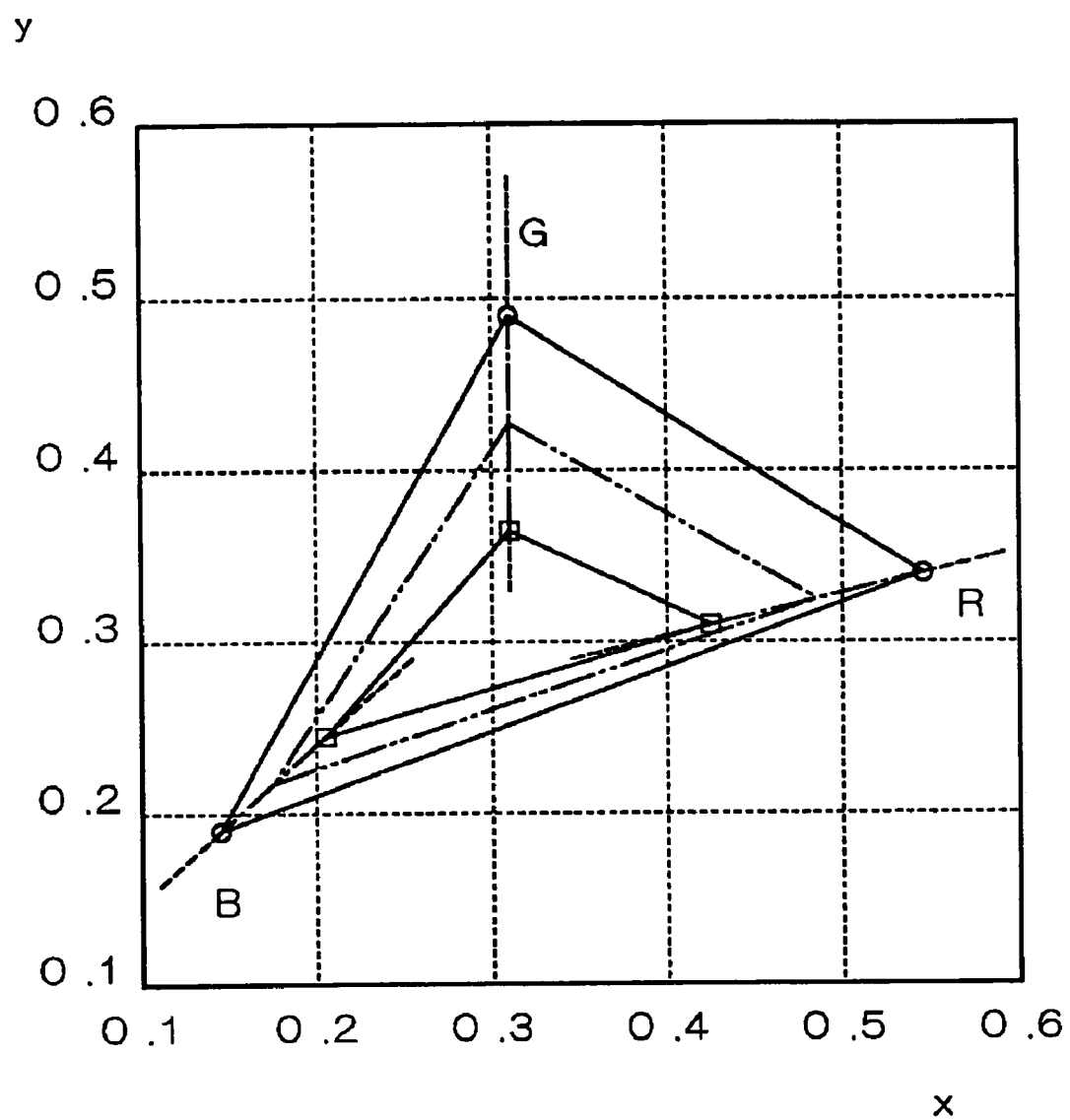
FIG. 10 is an x-y chromaticity diagram illustrating a tuning effect of colors according to the present invention.

In view of these problems, in this embodiment, both the hyperchromic portion 212c and the hypochromic portion 212d are formed so as to lie in the region above the corresponding aperture 211a as shown in FIG. 1(A). With this arrangement, since both the hyperchromic portion 212c and the hypochromic portion 212d contribute to determining the color of the transmissive display in the region above the corresponding aperture 211a, the color of the transmissive display can be tuned by changing at least one of the areas of the hyperchromic portion 212c and the hypochromic portion 212d formed in the region above the corresponding aperture. In this case, each of the RGB colors of the transmissive display can be obtained, in an x-y chromaticity diagram in FIG. 10, from a corresponding dotted chain line lying between a circled mark representing the corresponding color of the hyperchromic portion 212c and a square mark representing the corresponding color of the hypochromic portion 212d.

Also, as shown in FIG. 1(B), by forming both the hyperchromic portion 212c and the hypochromic portion 212d so as to lie in the region on the reflective layer 211 at each pixel, both the hyperchromic portion 212c and the hypochromic portion 212d contribute to determining the color of the transmissive display in the region on the reflective layer 211. With this arrangement, the color of the reflective display can be tuned by changing at least one of the areas of the hyperchromic portion 212c and the hypochromic portion 212d formed in the region on the reflective layer. In this case, each of the RGB colors of the reflective display can be obtained, in the x-y chromaticity diagram in FIG. 10, from the corresponding dotted chain line lying between the circled mark representing the corresponding color of the hyperchromic portion 212c and the square mark representing the corresponding color of the hypochromic portion 212d.

The configuration shown in FIG. 1(A) or 1(B) is realized in order to achieve at least one color from a plurality of colors as required. Also, although both the hypochromic portion and the hyperchromic portion lie either above the corresponding aperture or on the reflective layer at each pixel in the foregoing configuration, both the hypochromic portion and the hyperchromic portion may lie above the corresponding aperture and also on the reflective layer. In this case, the colors of both the reflective display and the transmissive display can be tuned.

Second Embodiment

Figure 2:
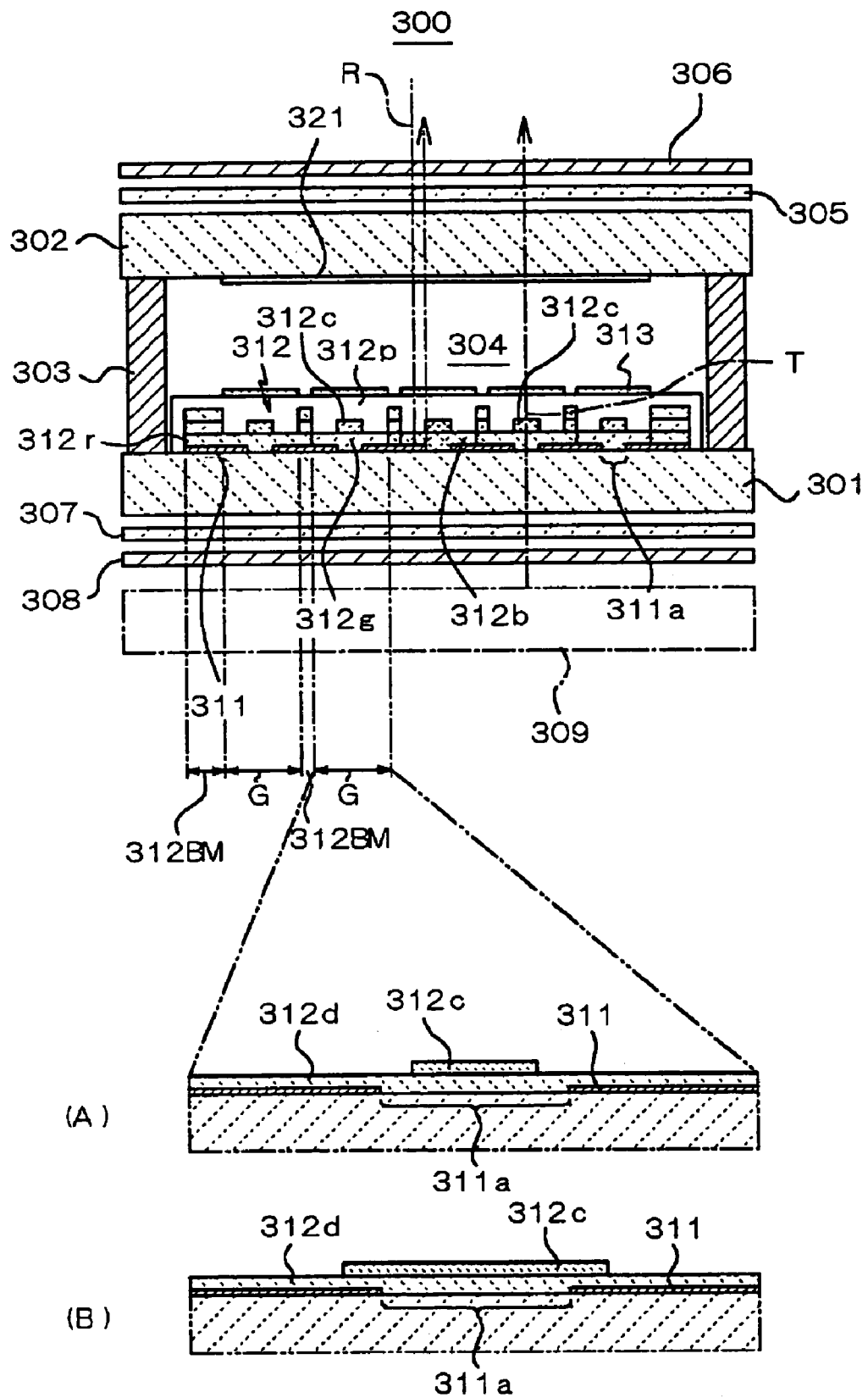
FIG. 2 is a schematic sectional view illustrating the structure of a liquid crystal display according to a second embodiment of the present invention.

Referring now to FIG. 2, an electrooptical device substrate 301 and a liquid crystal display panel 300 according to a second embodiment of the present invention will be described. In this embodiment, since the substrate 301, a substrate 302, sealing adhesive 303, liquid crystal 304, transparent electrodes 313 and 321, retardation films 305 and 307, and polarizers 306 and 308 are provided in a similar fashion to the first embodiment, a repeated description thereof will be omitted.

In this embodiment, the substrate 301 has a reflective layer 311 having apertures 311a on the surface thereof, and the reflective layer 311 has coloring layers 312r, 312g, and 312b formed thereon, one coloring layer disposed at each pixel. Each coloring layer is formed in the overall corresponding pixel so as to cover the corresponding aperture 311a. The coloring layer has a hypochromic portion 312d, formed on the foregoing reflective layer 311 over the whole pixel (refer to FIG. 2(A) or 2(B)), and a hyperchromic portion 312c which is stacked on the hypochromic portion 312d and which has the same hue as the hypochromic portion and a higher color density than the hypochromic portion.

In this embodiment, as shown in FIG. 2(A), there is a region in which no hyperchromic layer 312c is disposed above the corresponding aperture 311a. With this arrangement, since there are a region in which only the hypochromic layer 312d is disposed and another region in which the hyperchromic layer 312c overlaps the hypochromic layer 312d, both being disposed above the corresponding aperture 311a, the color of the transmissive display can be tuned by changing the area of the hyperchromic layer 312c.

Alternatively, as shown in FIG. 2(B), a part of the hyperchromic layer 312c may be disposed on the reflective layer 311. In this case, since there are a region in which the hyperchromic layer 312c overlaps the hypochromic layer 312d and another region in which only the hypochromic layer 312d is disposed, both being disposed on the reflective layer 311, the color of the reflective display can be tuned by changing the area of the hyperchromic layer 312c.

In this embodiment, since each of the coloring layers 312r, 312g, and 312b forms a stacked structure with the hypochromic portion 312d and the hyperchromic portion 312c, light traveling along the reflecting path R passes through only the hypochromic portion in the same manner as in the first embodiment, and light traveling along the transmitting path T passes through both the hypochromic portion and the hyperchromic portion 312c, which is different from the first embodiment. As a result, the chroma of the transmissive display can be improved in a similar fashion to the first embodiment, and the difference in the perceived color between the reflective display and the transmissive display can be reduced. In this case, since the transmitted light is transmitted through both the hypochromic portion and the hyperchromic portion, the hyperchromic portion 312c in this embodiment can be made thinner than that in the first embodiment. For example, when the light density of the hyperchromic portion is twice that of the hypochromic portion, the hyperchromic portion 312c can be made half as thin as the hypochromic portion so as to achieve optical characteristics in this embodiment which are equivalent to those in the first embodiment.

The configuration shown in FIG. 2(A) or 1(B) is realized in order to achieve at least one color from a plurality of colors as required. Also, although both the hypochromic portion and the hyperchromic portion lie either above the corresponding aperture or on the reflective layer at each pixel in the foregoing configuration, both the hypochromic portion and the hyperchromic portion may lie together above the corresponding aperture and on the reflective layer. In this case, the colors of both the reflective display and the transmissive display can be tuned.

Third Embodiment

Figure 3:
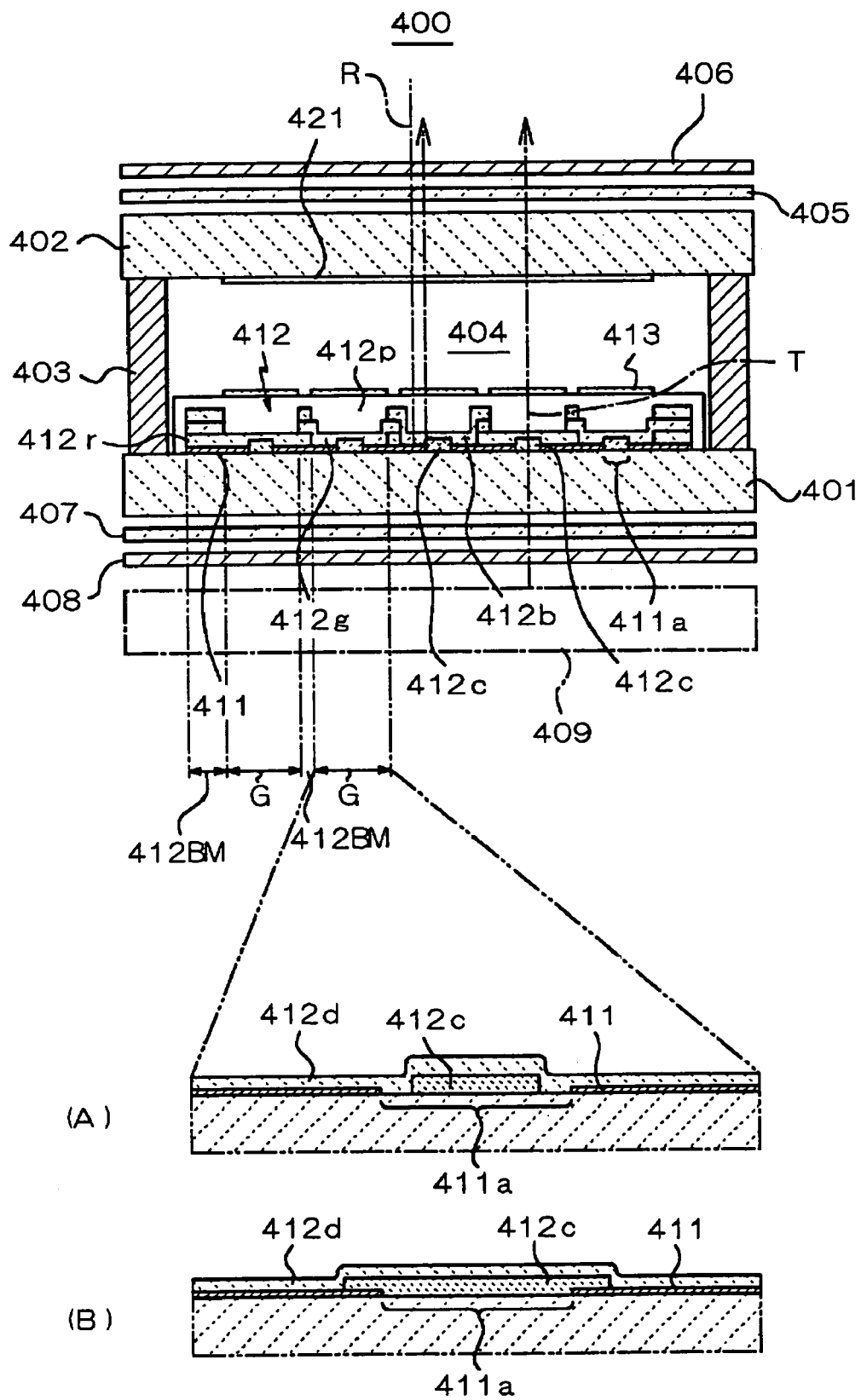
FIG. 3 is a schematic sectional view illustrating the structure of a liquid crystal display according to a third embodiment of the present invention.

Referring now to FIG. 3, an electrooptical device substrate 410 and a liquid crystal display panel 400 according to a third embodiment of the present invention will be described. Also, in this embodiment, since the substrate 401, a substrate 402, sealing adhesive 403, liquid crystal 404, transparent electrodes 413 and 421, retardation films 405 and 407, and polarizers 406 and 408 are provided in a similar fashion to the first embodiment, a repeated description thereof will be omitted.

Also, in this embodiment, the substrate 401 has a reflective layer 411 thereon having apertures 411a, and the reflective layer 411 has a color filter 412, directly formed thereon, having coloring layers 412r, 412g, and 412b, a stacked black matrix 412BM, and an overcoat film 412p, in a similar fashion to the foregoing embodiments.

In this embodiment, the substrate 401 has hyperchromic portions 412c formed thereon, one disposed at each pixel and serving as a part of each of the foregoing coloring layers, and the hyperchromic portion 412c has a hypochromic portion 412d formed thereon in the corresponding overall pixel, and has an light density lower than the hyperchromic portion 412c (refer to FIG. 3(A) or 3(B)).

In this embodiment, as shown in FIG. 3(A), there is a region in which no hyperchromic layer 412c is disposed above the corresponding aperture 411a. With this arrangement, since there are a region in which only the hypochromic layer 412d is disposed above the corresponding aperture 411a and another region in which the hypochromic layer 412d overlaps the hyperchromic layer 412c, the color of the transmissive display can be tuned by changing the area of the hyperchromic layer 412c.

Alternatively, as shown in FIG. 3(B), a part of the hyperchromic layer 412c may be disposed on the reflective layer 411. In this case, since there are a region in which the hypochromic layer 412d overlaps the hyperchromic layer 412c and another region in which only the hypochromic layer 412d is disposed, both being disposed on the reflective layer 411, the color of the reflective display can be tuned by changing the area of the hyperchromic layer 412c.

The configuration shown in FIG. 3(A) or 3(B) is realized in order to achieve at least one color from a plurality of colors as required. Also, although both the hypochromic portion and the hyperchromic portion lie either above the corresponding aperture or on the reflective layer at each pixel in the foregoing configuration, both the hypochromic portion and the hyperchromic portion may lie together above the corresponding aperture and on the reflective layer. In this case, the colors of both the reflective display and the transmissive display can be tuned.

Fourth Embodiment

Figure 4:
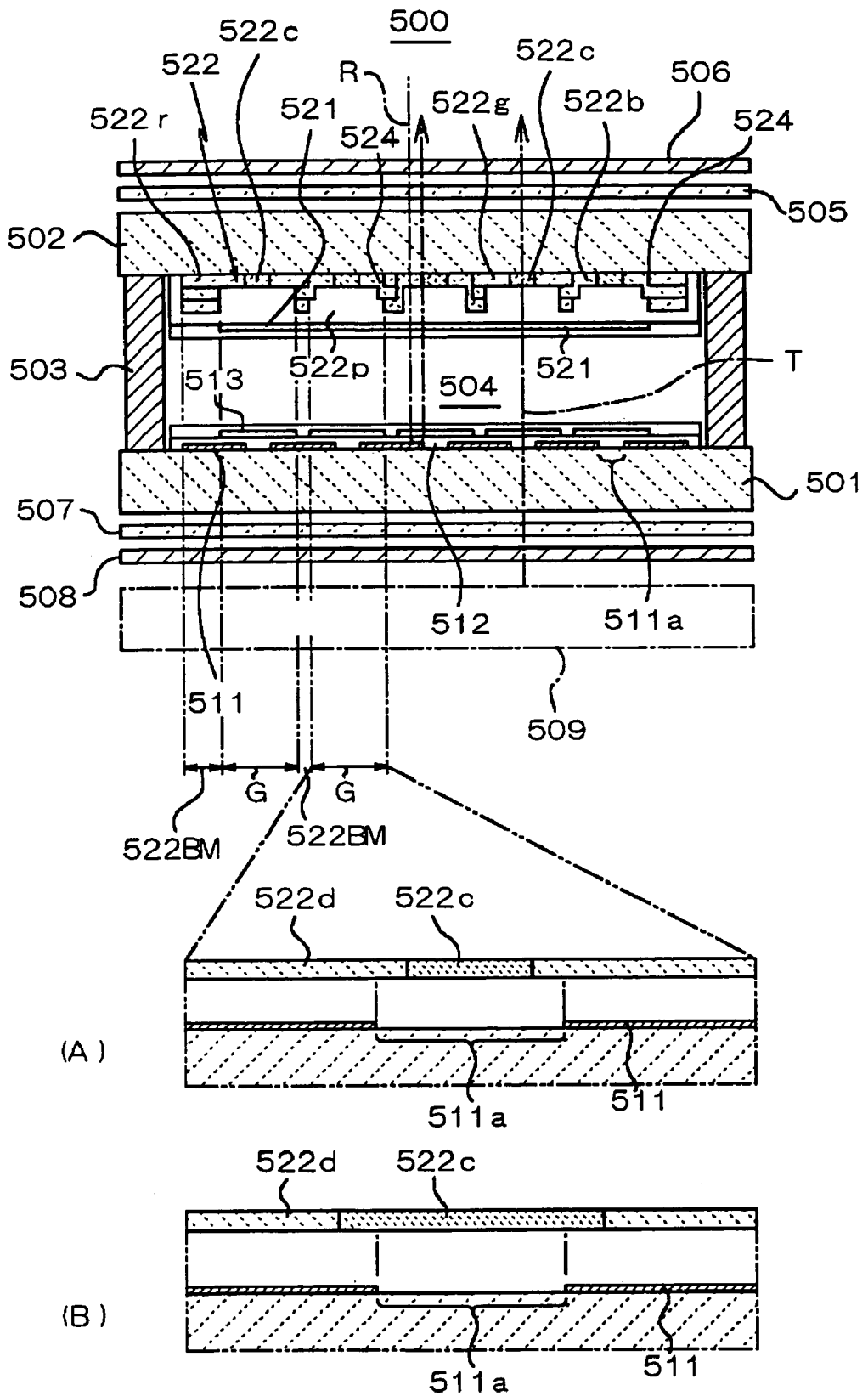
FIG. 4 is a schematic sectional view illustrating the structure of a liquid crystal display according to a fourth embodiment of the present invention.

Referring now to FIG. 4, an electrooptical device substrate 502 and a liquid crystal display panel 500 according to a fourth embodiment of the present invention will be described.

Also in this embodiment, since a substrate 501 and the substrate 502, sealing adhesive 503, liquid crystal 504, transparent electrodes 513 and 521, retardation films 505 and 507, and polarizers 506 and 508 are provided in a similar fashion to the first embodiment, a repeated description thereof will be omitted.

Unlike the configurations in the foregoing first to third embodiments in which the color filters are formed on the substrates having the reflective layers, in this embodiment, the substrate 501 having a reflective layer 511 has no color filter formed thereon; instead, the substrate 502 opposing the substrate 501 has a color filter 522 formed thereon.

The substrate 501 has the reflective layer 511 thereon having apertures 511a in the same manner as in the foregoing embodiments, the reflective layer 511 has a transparent insulating film 512 thereon, and the insulating film 512 has the transparent electrodes 513 thereon.

On the other hand, the substrate 502 has coloring layers 522r, 522g, and 522b thereon. Each coloring layer has a hypochromic portion 522d (refer to FIG. 4(A) or 4(B)), mainly formed in the region which does not two-dimensionally overlap the corresponding aperture 511a, and has a hyperchromic portion 522c which is mainly formed in the region two-dimensionally overlapping the corresponding aperture 511a of the foregoing reflective layer 511 and which has a higher light density than the hypochromic portion 522d. Moreover, the foregoing coloring layers have a stacked black matrix 522BM and an overcoat film 522p thereon so as to form the color filter 522.

In this embodiment, since light traveling along the reflecting path R passes through the hypochromic portion of the coloring layer twice and light traveling along the transmitting path T passes through the hyperchromic portion 522c, the same optical effects and advantages as in the first embodiment are obtained.

The electrooptical device substrate according to this embodiment is the substrate 502, and the substrate 502 has no reflective layer thereon, which is different from the foregoing embodiments. That is, the electrooptical device substrate according to this embodiment is the substrate opposing the substrate 501 having the reflective layer. In such an electrooptical device substrate having no reflective layer, by forming the hyperchromic portion in a part of the coloring layer disposed at each pixel, the perceived color characteristics of a transflective liquid crystal display panel can be improved.

Also, in this embodiment, as shown in FIG. 4(A), there is a region which two-dimensionally overlaps the corresponding aperture 511a and in which no hyperchromic portion 522c is disposed; instead, the hypochromic portion 522d is disposed in the region. In other words, a part of the hypochromic portion 522d is disposed so as to two-dimensionally overlap the corresponding aperture 511a.

Alternatively, as shown in FIG. 4(B), there may be a region which two-dimensionally overlaps the reflective layer 511 and in which no hypochromic portion 522d is disposed; instead, the hyperchromic portion 522c may be disposed in the region. In other words, a part of the hyperchromic portion 522c may be disposed so as to two-dimensionally overlap the reflective layer 511.

With the above-described configuration, the color of the transmissive display or the reflective display can be easily tuned at low cost in the same manner as in the first embodiment.

Although, in this embodiment, the color filter 522 having the same structure as in the first embodiment is formed on the substrate 502 which opposes the substrate 501 having the reflective layer 511 thereon the color filter 522 may have a structure in which the hyperchromic portions are stacked on the hypochromic portions in a similar fashion to the second embodiment, or the hypochromic portions are stacked on the hyperchromic portions in a similar fashion to the third embodiment. Also, in these cases, the color filter may be constructed in the same fashion as shown in FIG. 2(A) or 2(B) in the second embodiment, or in FIG. 3(A) or 3(B) in the third embodiment.

The configuration shown in FIG. 4(A) or 4(B) is realized in order to achieve at least one color from a plurality of colors as required. Also, although both the hypochromic portion and the hyperchromic portion lie either above the corresponding aperture or on the reflective layer at each pixel in the foregoing configuration, both the hypochromic portion and the hyperchromic portion may lie together above the corresponding aperture and on the reflective layer. In this case, the colors of both the reflective display and the transmissive display can be tuned.

Fifth Embodiment

Figure 5:
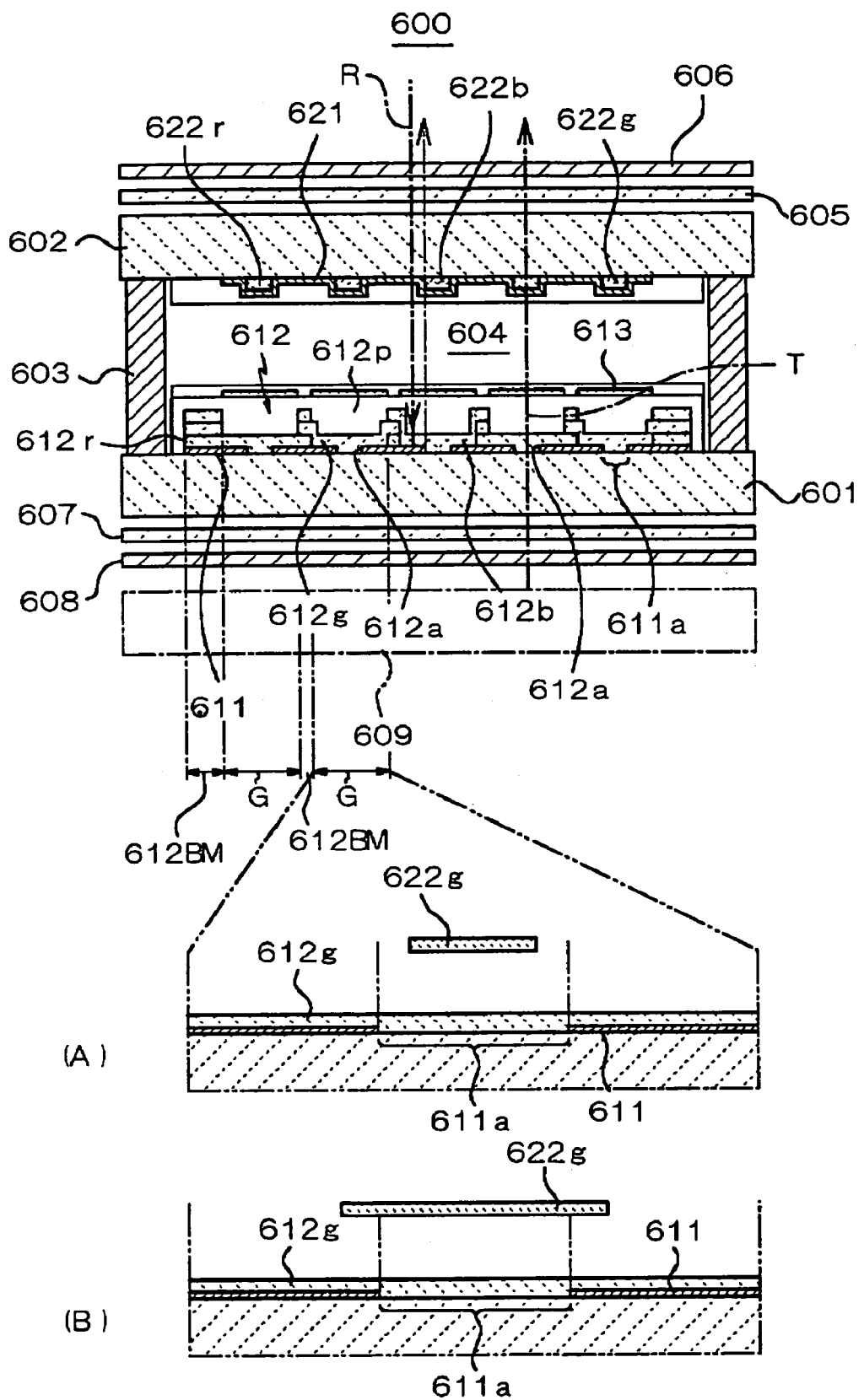
FIG. 5 is a schematic sectional view illustrating the structure of a liquid crystal display according to a fifth embodiment of the present invention.

Referring now to FIG. 5, an electrooptical device substrate and an electrooptical device according to a fifth embodiment of the present invention will be described. FIG. 5 is a schematic sectional view illustrating the structure of a liquid crystal display panel 600 according to this embodiment.

Since the liquid crystal display panel 600 has substrates 601 and 602, sealing adhesive 603, liquid crystal 604, transparent electrodes 613 and 621, retardation films 605 and 607, and polarizers 606 and 608 in a similar fashion to the first embodiment, a repeated description thereof will be omitted.

Also, the substrate 601 has a reflective layer 611 on the surface thereof, having apertures 611a and the reflective layer 611 has a color filter 612 thereon in a similar fashion to the first embodiment. In this embodiment, the color filter 612 has hypochromic layers 612r, 612g, and 612b having a uniform color density, a stacked black matrix 612BM, and an overcoat film 612p.

On the other hand, the substrate 602 has hyperchromic layers 622r, 622g, and 622b formed thereon so that each of the hyperchromic layers two-dimensionally overlaps the corresponding aperture 611a of the reflective layer 611, and the hyperchromic layers 622r, 622g, and 622b have the transparent electrodes 621 formed thereon. The hyperchromic layers 622r, 622g, and 622b have a higher color density than the foregoing hypochromic layers 612r, 612g, and 612b.

In this embodiment, while light traveling along the reflecting path R mainly passes through the hypochromic layer on the substrate 601 twice, light traveling along the transmitting path T mainly passes through the foregoing hypochromic layer and then further passes through the hyperchromic layer. Accordingly, when compared to the known liquid crystal display panel having a structure shown in FIG. 11, the chroma of the transmissive display can be improved, and the difference in the perceived color between the reflective display and the transmissive display can be reduced.

In this embodiment, as shown in FIG. 5(A), there is a region at each pixel, which two-dimensionally overlaps the corresponding aperture 611a and in which, for example, no hyperchromic layer 622g is disposed; instead, only the hypochromic layer 612g is disposed in the region so as to two-dimensionally overlap the corresponding aperture 611a. Thus, there is a large region including the foregoing region at each pixel, which two-dimensionally overlaps the corresponding aperture 611a. Since this large region has two portions, one having only the hypochromic layer 612g disposed therein and the other having the hyperchromic layer 622g superposed on the hypochromic layer 612g, the color of the transmissive display can be easily tuned by changing the area of the hyperchromic layer 622g.

Alternatively, as shown in FIG. 5(B), a part of the hyperchromic layer 622g may be disposed so as to two-dimensionally overlap the reflective layer 611. In this case, there is a region at each pixel, which two-dimensionally and exactly overlaps the reflective layer 611. Since this region has two portions, one having only the hypochromic layer 612g disposed therein and the other having the hyperchromic layer 622g superposed on the hypochromic layer 612g, the color of the reflective display can be easily tuned by changing the area of the hyperchromic layer 622g.

The foregoing structure is applicable to colors other than the color G in the same fashion as described above. Also, it is enough that the color filter 612 is constructed so as to have the foregoing structure for at least one color among the plurality of colors.

Although, in this embodiment, each of the hypochromic layers on the substrate 601 extends over the whole pixel and each of the hyperchromic layers on the substrate 602 is disposed so as to two-dimensionally overlap the corresponding aperture 611a of the reflective layer 611, alternatively the hypochromic layer on the substrate 601 may be disposed so as not to overlap the corresponding aperture 611a of the reflective layer 611. In this case, the similar optical structure as in the first embodiment can be obtained.

Although the hypochromic layers are formed on the substrate 601 having the reflective layer 611 in this embodiment, on the contrary, the hyperchromic layers may be formed on the substrate having the reflective layer and the hypochromic layers may be formed on the other substrate.

Furthermore, although both the hypochromic portion and the hyperchromic portion lie either above the corresponding aperture or on the reflective layer at each pixel in the configuration shown in FIG. 1(A) or 1(B), both the hypochromic portion and the hyperchromic portion may lie together above the corresponding aperture and on the reflective layer. In this case, the colors of both the reflective display and the transmissive display can be tuned.

Sixth Embodiment

Figure 7:
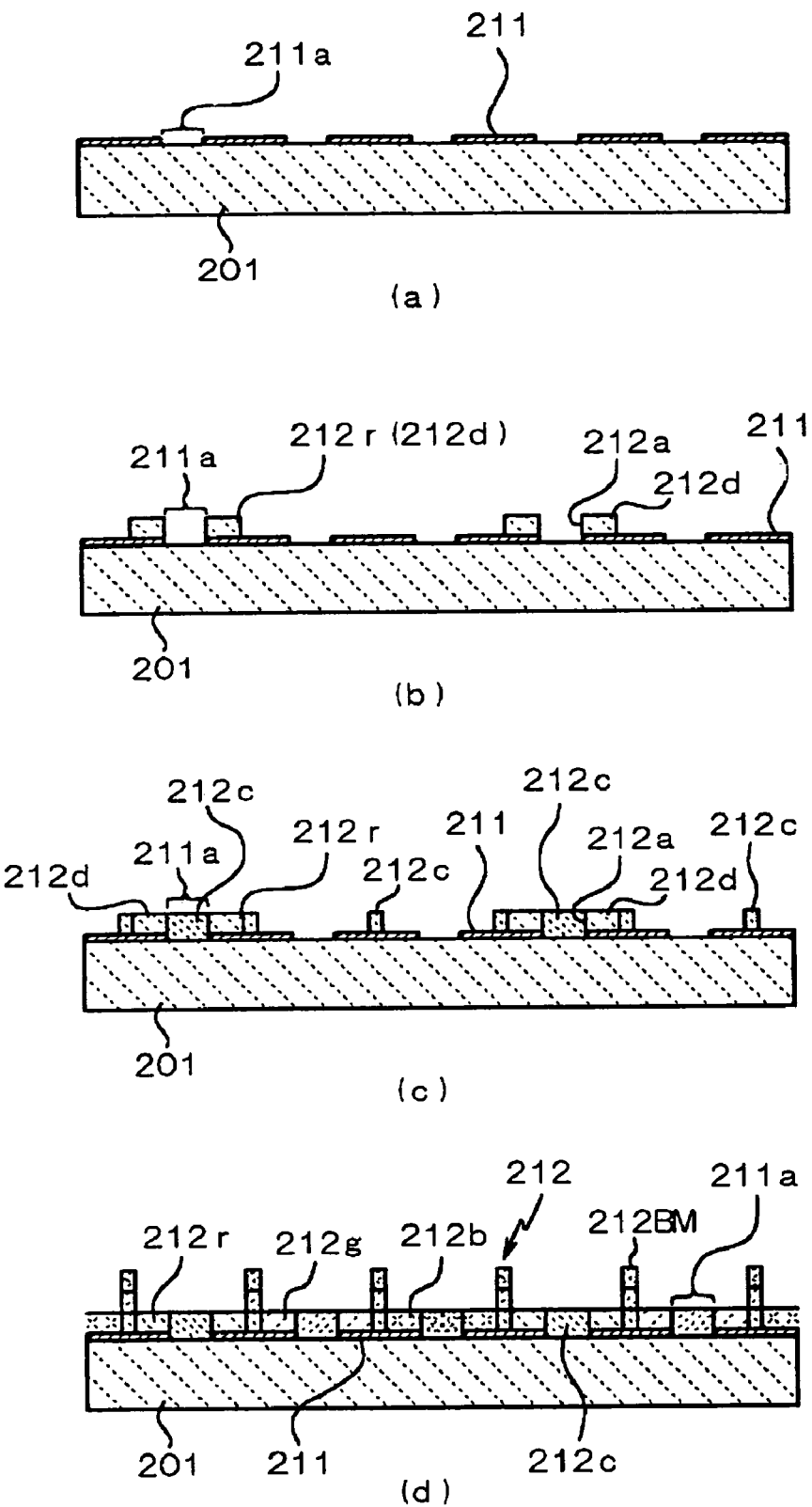
FIG. 7 includes schematic process charts FIGS. 7(a) to 7(d) of a method for fabricating the electrooptical device substrate according to a sixth embodiment of the present invention.

Referring now to FIG. 7, a method for fabricating an electrooptical device substrate according to a sixth embodiment of the present invention will be described. The method for fabricating an electrooptical device substrate relates to the fabrication of the electrooptical device substrate used for the liquid crystal display panel 200 according to the first embodiment.

First, as shown in FIG. 7(a), the reflective layer 211 having the apertures 211a is formed by forming a thin film, composed of a metal such as aluminum, an aluminum alloy, a silver alloy, or chrome, on the surface of the substrate 201 by evaporation, sputtering, or the like, and then by patterning the thin film by a known photolithographic technique.

Second, as shown in FIG. 7(b), the hypochromic portions 212d of the coloring layers 212r are formed on the patterned thin film by applying a colored photosensitive resin (photosensitive resist) in which a pigment, a dye, or the like for representing a predetermined hue is dispersed, and then by patterning it with a predetermined pattern by exposure and developing. Each of the hypochromic portions 212d has a pattern having a non-hypochromic region (an opening) above the corresponding aperture 211a of the foregoing reflective layer 211. Subsequently, as shown in FIG. 7(c), the hyperchromic portions 212c are formed in the non-hypochromic regions of the hypochromic portions 212d by applying a photosensitive resin containing a colorant, such as a pigment or a dye, whose density is higher than the foregoing hypochromic portions, and then by patterning it in the same fashion as described above. In this step, the patterning is performed so as to form the hyperchromic portions 212c in the spaces between the adjacent pixels. Thus, by repeating a similar step to that described above for the coloring layers 212g and 212b having other hues, the coloring layers, each being used for the corresponding color and having the hyperchromic portion 212c and the hypochromic portion 212d, are sequentially formed as shown in FIG. 7(d). In this step, the stacked black matrix 212BM having a plurality of stacked coloring layers (three layers stacked in the figure) is formed by patterning the coloring layers so as to overlap one after another in the spaces between the adjacent pixels. Since the stacked black matrix 212BM according to this embodiment is configured by stacking the hyperchromic portions 212c, each having a different hue, as shown in FIG. 7(d), a high shielding effect can be achieved.

In the reverse order to the above-described forming order of the coloring layers, first the hyperchromic portions 212c and then the hypochromic portions may be formed. Also, for the coloring layers having the plurality of hues, the hypochromic portions may be sequentially formed first and then the hyperchromic portions may be sequentially formed, or inversely for the coloring layers having the plurality of hues, the hyperchromic portions may be sequentially formed first and then the hypochromic portions may be sequentially formed. Furthermore, instead of the foregoing stacked black matrix, a black light-shielding layer may be formed by disposing a black resin.

In the step of forming the foregoing coloring layers, a material which can easily form a flat surface is used as a photosensitive resin. The material is applied by a method such as spin coating, which can easily make a flat layer. Thus, the surface of each coloring layer is made substantially flat in each pixel.

The electrooptical device substrate formed in the above-described manner has a substantially flat surface since the overcoat film 212p (not shown) is formed. Subsequently, the liquid crystal display panel 200 shown in FIG. 1 is fabricated by using the substrate 201 which is the electrooptical device substrate.

When the liquid crystal display panel 200 shown in FIG. 1 is to be fabricated, the color filter 212 formed on the foregoing substrate 201 has a transparent conductor formed thereon by sputtering, and then has the transparent electrodes 213 formed by patterning the transparent conductor with a known photolithographic technique. Subsequently, the transparent electrodes 213 have an alignment film thereon composed of a polyimide resin or the like, and then a rubbing treatment is applied to the alignment film.

Then, the foregoing substrates 201 and 202 are bonded to each other with the sealing adhesive 203 so as to form a panel structure. In this step, the substrate 202 has the transparent electrodes 221 and an alignment film, which is similar to the foregoing alignment film, on the surface thereof. The substrates 201 and 202 are bonded to each other so as to maintain a substantially fixed distance between these two substrates with spacers (not shown) dispersed between these substrates and other spacers mixed in the sealing adhesive 203.

Subsequently, the liquid crystal 204 is injected into the space between the two substrates via an opening (not shown) of the sealing adhesive 203 and then the opening of the sealing adhesive 203 is closed with sealant such as an ultraviolet curable resin. After completion of the main panel structure as described above, the foregoing retardation films 205 and 207, and the foregoing polarizers 206 and 208 are disposed on the surfaces of the substrates 201 and 202, respectively, by bonding or the like.

Seventh Embodiment

Figure 8:
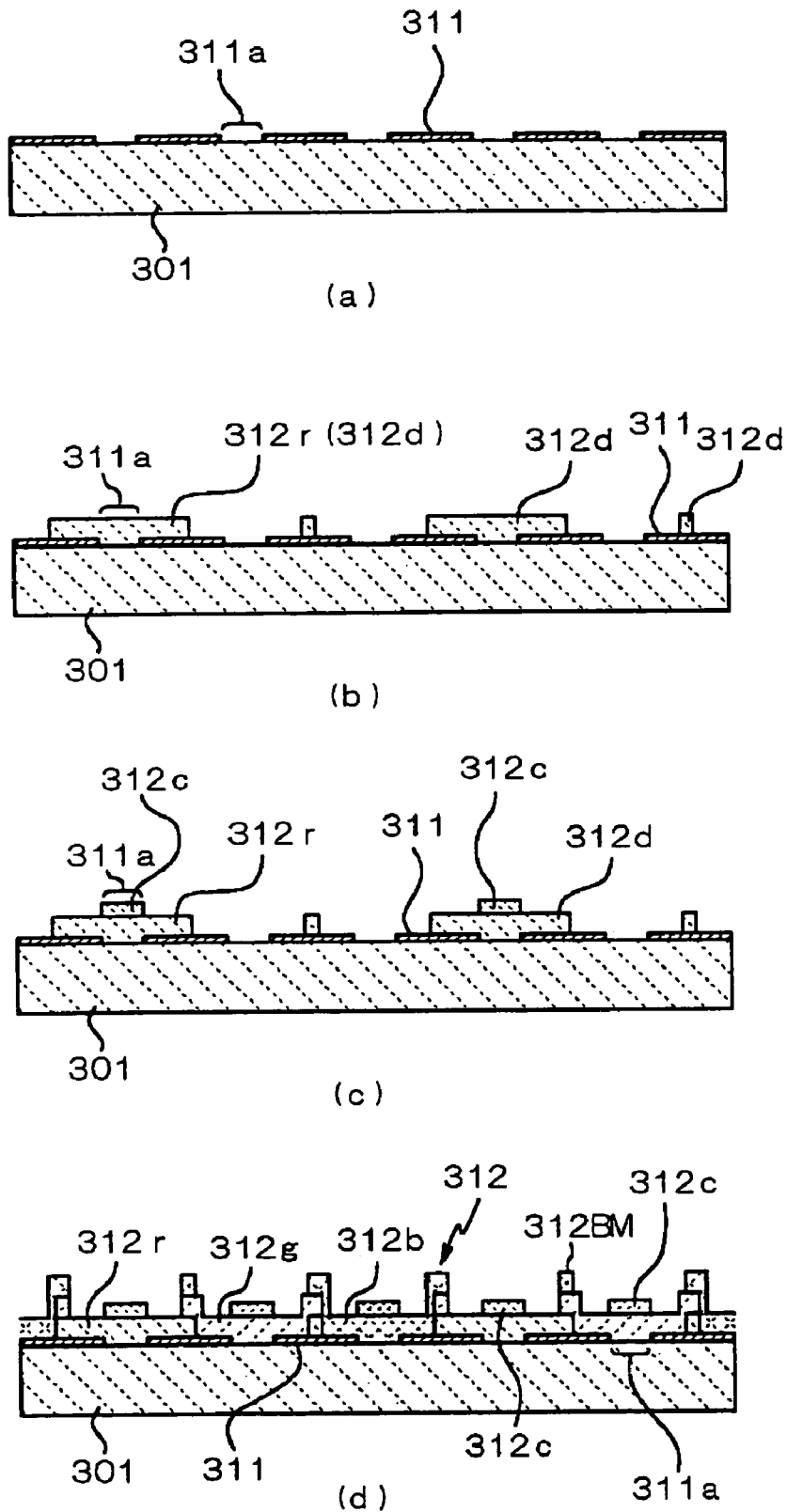
FIG. 8 includes schematic process charts FIGS. 8(a) to 8(d) of a method for fabricating the electrooptical device substrate according to a seventh embodiment of the present invention.

Referring now to FIG. 8, a method for fabricating an electrooptical device substrate according to a seventh embodiment of the present invention will be described. This embodiment relates to a method for fabricating an electrooptical device substrate which corresponds to the substrate 310 used for the liquid crystal display panel 300, shown in FIG. 2, according to the second embodiment.

First, in this embodiment, the reflective layer 311 having the apertures 311a is formed on the substrate 301, as shown in FIG. 8(a).

Second, as shown in FIG. 8(b), the hypochromic portions 312d for the coloring layers 312r are formed on the reflective layer 311. The hypochromic portions 312d are formed so as to cover the apertures 311a of the reflective layer 311. In this step, the hypochromic portions 312d are also formed in the spaces between the adjacent pixels.

As shown in FIG. 8(c), the hyperchromic portions 312c are then formed on the foregoing hypochromic portions and just above the apertures 311a of the reflective layer 311 so as to complete the coloring layers 312r having the hyperchromic portions 312c partially stacked on the corresponding hypochromic portions. Thus, by repeating such a step for the coloring layers having other hues in a similar fashion as that described above, the coloring layers 312r, 312g, and 312b are formed as shown in FIG. 8(d). In this step, the stacked black matrix 312BM is also formed in a similar fashion to that described above. Although the stacked black matrix 312BM according to this embodiment is formed by stacking the hypochromic portions 312d having different colors from each other, it may be formed by stacking the hyperchromic portions in the same fashion as that in the sixth embodiment.

In this embodiment, although the coloring layers are sequentially formed for each color, the hypochromic portions for the plurality of hues may be formed, followed by the hyperchromic portions for the plurality of hues.

By using the electrooptical device substrate according to this embodiment, the liquid crystal display panel 300 shown in FIG. 2 is fabricated in the same fashion as that described in the sixth embodiment.

Other Embodiments

Figure 9:
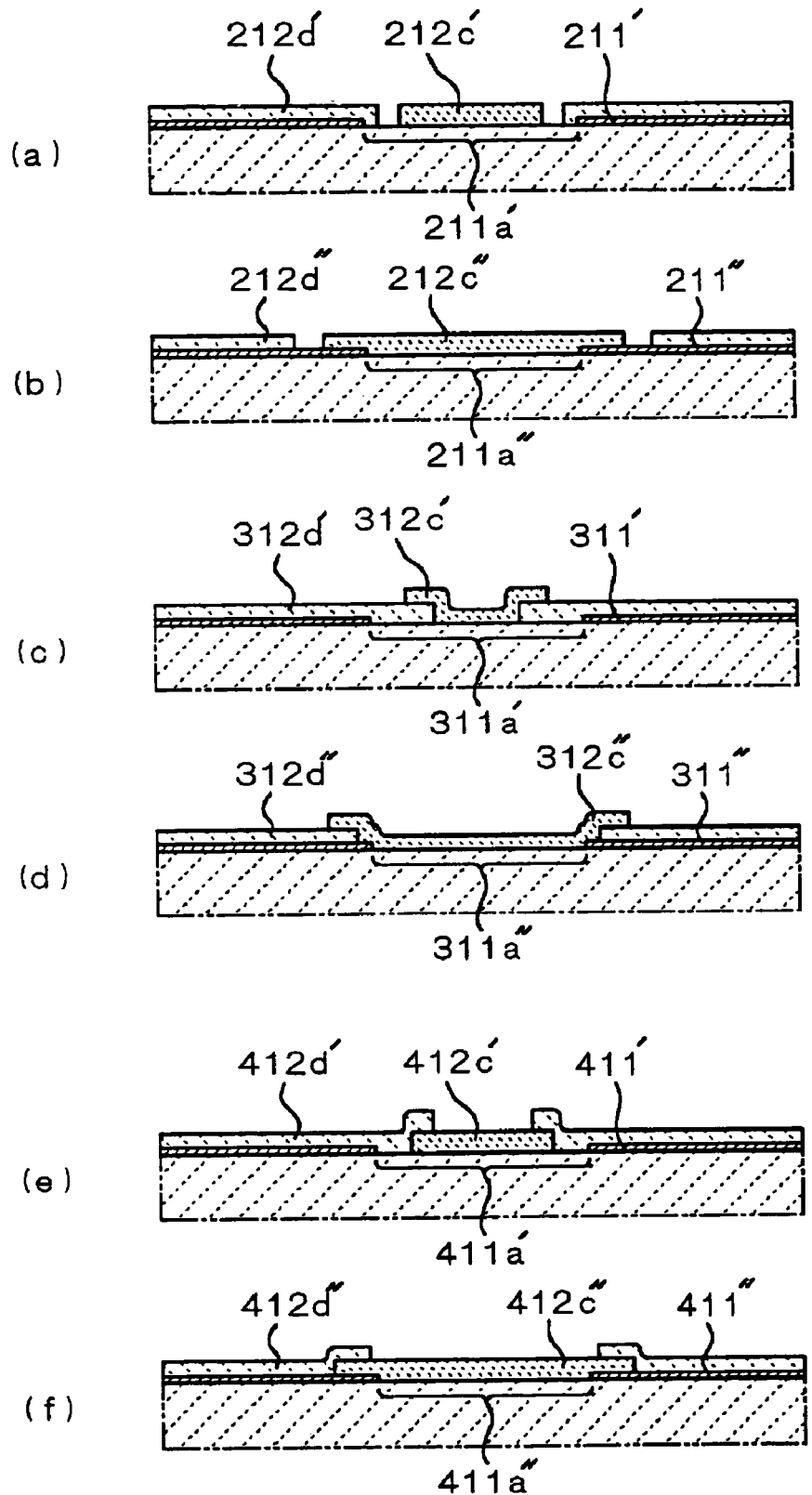
FIG. 9 includes schematic partial sectional views FIGS. 9(a) to 9(d) illustrating other example configurations applicable to the above-described embodiments.

Referring now to FIG. 9, modifications of the electrooptical device substrates, the electrooptical devices, and the methods for fabricating electrooptical device substrates and electrooptical devices according to the embodiments of the present invention will be described. In the foregoing embodiments, since the edge of the hyperchromic portion and the edge of the corresponding hypochromic portion are closely in contact with each other at each pixel (in the first embodiment), or one of the hyperchromic portion and the corresponding hypochromic portion completely overlaps the other at each pixel (in the second and third embodiments), the reflective layer and the corresponding aperture are completely covered by at least one of the hyperchromic portion and the hypochromic portion. However, hyperchromic portions 212c' and 212" and hypochromic portions 212d' and 212d" have a gap therebetween at each pixel in example configurations shown in FIGS. 9(a) and 9(b), respectively, thereby providing a region which is not occupied by the corresponding coloring layer. With these configurations, when the region which is not occupied by the coloring layer is provided above an aperture 211a', as shown in FIG. 9(a), the transmissive display can be made bright by making the color of the transmissive display faint. Also, when the region which is not occupied by the coloring layer is provided on a reflective layer 211", as shown in FIG. 9(b), the reflective display can be made bright by making the color of the reflective display faint. Thus, the colors of the transmissive and reflective displays can be tuned by changing the areas of the foregoing regions, in both cases, which are not occupied by the coloring layers. In particular, when such a gap region is provided in the coloring layer, each of the colors of the transmissive and reflective displays can be tuned in the region (indicated by a corresponding broken line in FIG. 10) where the light density is lower than that of the corresponding color of the hyperchromic portion, wherein the corresponding color is represented by the square mark in the color chromaticity diagram in FIG. 10.

Also, FIGS. 9(c) and 9(d) illustrate other example configurations in which hyperchromic portions 312c' and 312c" are stacked on the edges of hypochromic portions 312d' and 312d" at each pixel, respectively. With these configurations, when the hyperchromic portion 312c' overlaps the hypochromic portion 312d' above an aperture 311a', as shown in FIG. 9(c), the chroma of the transmissive display can be improved by making the color of the transmissive display dark. In addition, when the hyperchromic portion 312c" overlaps the hypochromic portion 312d" on a reflective layer 311" at each pixel, as shown in FIG. 9(d), the chroma of the reflective display can be improved by making the color of the reflective display dark. Thus, the colors of the transmissive and reflective displays can be tuned by changing the areas of the foregoing overlapped portions in both cases. In particular, when such an overlapped portion is provided in the coloring layer, each of the colors of the transmissive and reflective displays can be tuned in the region (indicated by a corresponding broken line in FIG. 10) where the light density is higher than that of the corresponding color of the hyperchromic portion, wherein the corresponding color is represented by the circled mark in the color chromaticity diagram in FIG. 10.

Furthermore, FIGS. 9(e) and 9(f) illustrate other example structures in which hypochromic portions 412d' and 412d" are stacked on the edges of hyperchromic portion 412c' and 412c" at each pixel, respectively. With these configurations, when the hypochromic portion 412d' overlaps the hyperchromic portion 412c' above an aperture 411a', as shown in FIG. 9(e), the chroma of the transmissive display can be improved by making the color of the transmissive display dark. Also, when the hypochromic portion 412d" overlaps the hyperchromic portion 412c" on the reflective layer 411", as shown in FIG. 9(f), the chroma of the reflective display can be improved by making the color of the reflective display dark. Thus, the colors of the transmissive and reflective displays can be tuned by changing the foregoing overlapped areas in both cases. In particular, when such an overlapped portion is provided in the coloring layer, each of the colors of the transmissive and reflective displays can be tuned in the region (indicated by a corresponding broken line in FIG. 10) where the light density is higher than that of the corresponding color of the hyperchromic portion, wherein the corresponding color is represented by the circled mark in the color chromaticity diagram in FIG. 10.

The foregoing positional relationships between the hypochromic portions and the hyperchromic portions illustrated in FIGS. 9(a) to 9(f) are also applicable, with respect to the two-dimensional mutually overlapping relationship, to the structure according to the fourth embodiment in which the reflective layer and the color filters are formed on the respective substrates, and to the other structure according to the fifth embodiment in which the hypochromic layers and the hyperchromic layers are formed on the respective substrates. More particularly, in the fourth and fifth embodiments, the hypochromic portion (hypochromic layer) and the hyperchromic portion (hyperchromic layer) may have a gap two-dimensionally formed therebetween, as shown in FIGS. 9(a) and 9(b), and a part of the hypochromic portion (hypochromic layer) may two-dimensionally overlap another part of the hyperchromic portion (hyperchromic layer), as shown in FIGS. 9(c) to 9(f).

The present invention is not limited the electrooptical device substrates, the electrooptical devices, the methods for fabricating the electrooptical device substrates and the electrooptical devices in the examples illustrated by the foregoing figures; those skilled in the art will appreciate that various modifications can be made without departing from the spirit of the present invention.

Although a passive-matrix liquid crystal display panel is exemplified in all the above-described embodiments, for example, the electrooptical device according to the present invention is also applicable to an active-matrix liquid crystal display panel (e.g., a liquid crystal display panel having TFTs (thin film transistors) or TFDs (thin film diodes) as switching elements). Other than the liquid crystal display panel, the present invention is also applicable to a variety of electrooptical devices in which the display state of a plurality of pixels is controllable, such as an electroluminescent device, an organic electroluminescent device, an inorganic electroluminescent device, an FED (field emission display) device, an LED (light emitting diode) display device, a plasma display device, an electrophoretic display device, a thin cathode ray tube, a small TV using a liquid crystal shutter or the like, and an apparatus using a digital micro-mirror device (DMD).

Electronic Apparatus Embodiments

Figure 12:
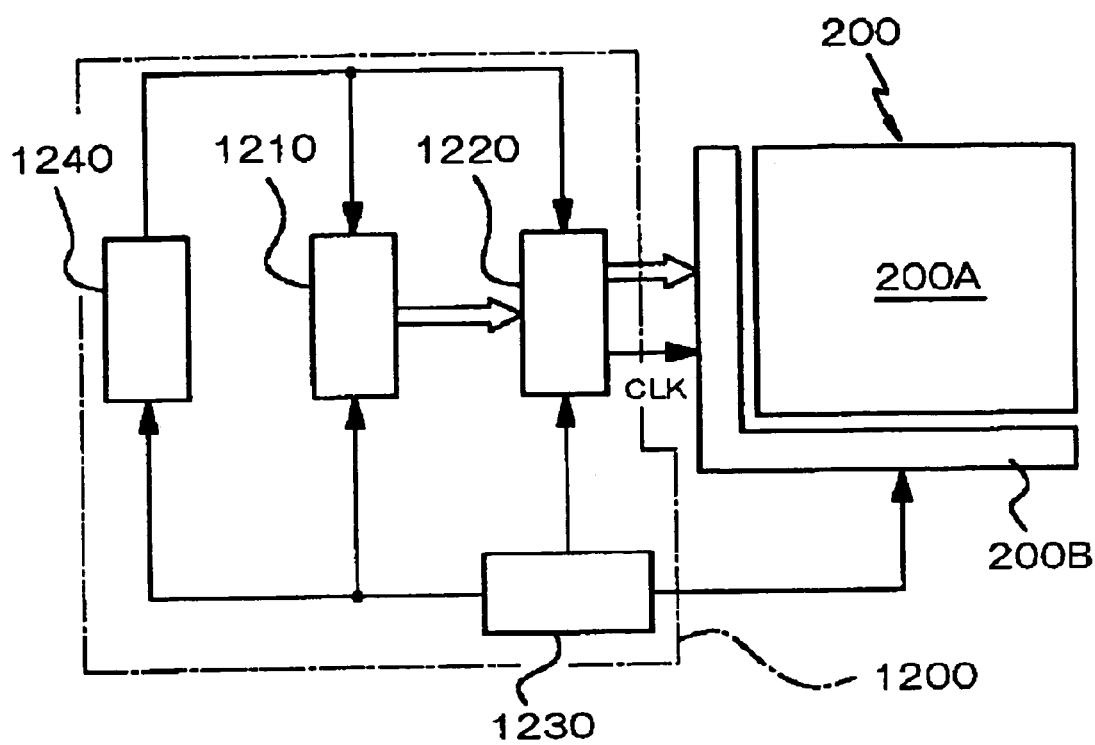
FIG. 12 is a schematic block diagram illustrating the configuration of an electronic apparatus according to the present invention.

Last, an electronic apparatus according to an electronic apparatus embodiment will be described wherein the electronic apparatus uses a liquid crystal device, including the foregoing liquid crystal display panel, as a display device. FIG. 12 is a schematic block diagram illustrating the overall configuration of this embodiment. An electronic apparatus shown in this drawing has the liquid crystal display panel 200, the same as described above, and control means 1200 for controlling it. In the drawing, the liquid crystal display panel 200 is conceptually illustrated so as to have a panel structure 200A and a drive circuit 200B including a semiconductor IC and so forth. The control means 1200 includes a display-information output source 1210, a display process circuit 1220, a power circuit 1230, and a timing generator 1240.

The display-information output source 1210 has a memory such as a ROM (read only memory) and a RAM (random access memory), a storage unit including a magnetic storage disk, an optical storage disk, and so forth, and a tuning circuit for outputting a tuned digital image signal, and sends display information in the form of an image signal and the like with a predetermined format to the display-information process circuit 1220 in response to a variety of clock signals generated by the timing generator 1240.

The display-information process circuit 1220 has a variety of known circuits such as a serial-parallel conversion circuit, an amplification and reversion circuit, a rotation circuit, a gamma correction circuit, and a clamp circuit, processes the input display information, and sends the processed image information together with a clock signal CLK to the drive circuit 200B. The drive circuit 200B includes a scan line drive circuit, a data line drive circuit, and a testing circuit. The power circuit 1230 feeds a predetermined voltage to each of the above described components.

Figure 13:
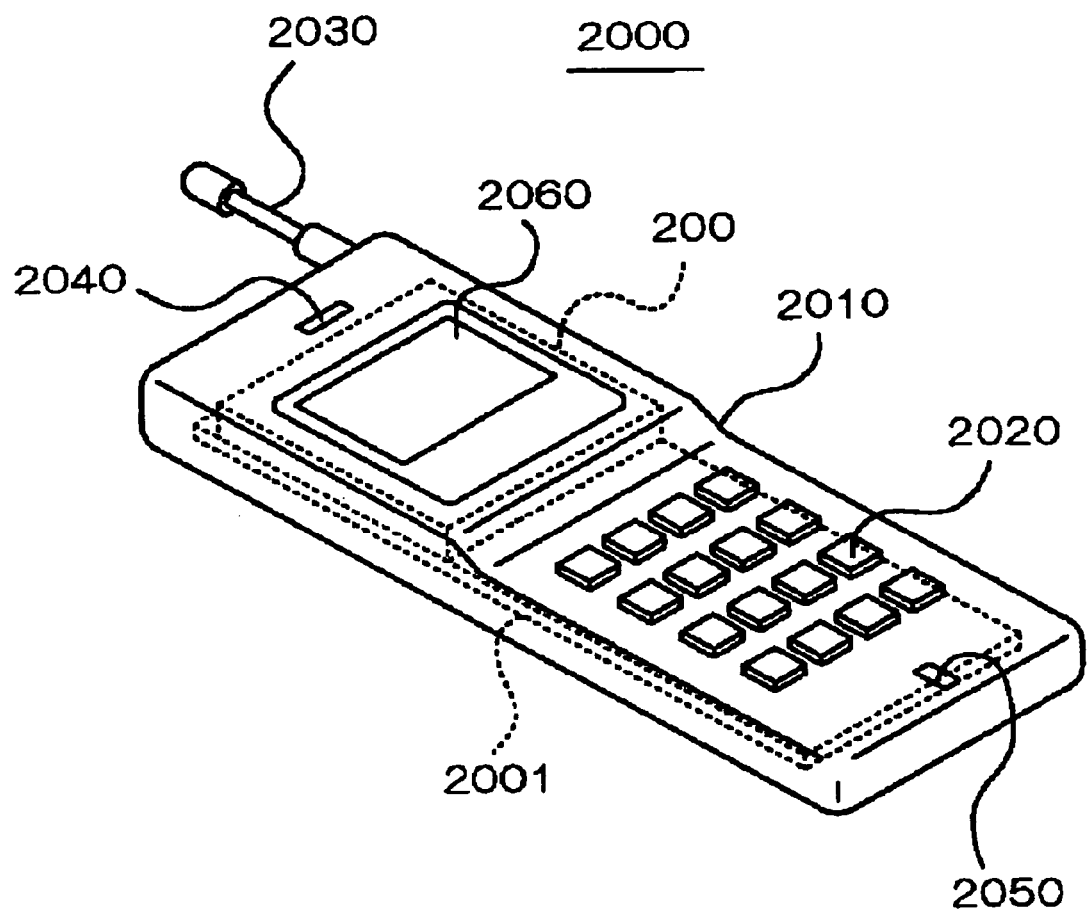
FIG. 13 is a perspective view of the external appearance of a portable phone as an example electronic apparatus.

FIG. 13 illustrates a portable phone as an example of the electronic apparatus according to this embodiment of the present invention. A portable phone 2000 is constructed such that a casing 2010 has a circuit board 2001 disposed therein and the circuit board 2001 has the foregoing liquid crystal display panel 200 mounted thereon. The casing 2010 has an array of operation buttons 2020 on the front surface thereof and an antenna 2030 retractably attached at one end thereof. A receiver 2040 has a speaker disposed therein and a transmitter 2050 has a built-in microphone therein.

The display surface of the liquid crystal display panel 200 installed in the casing 2010 is visible through a display window 2060.

The electronic apparatus according to the present invention is not limited to the foregoing examples illustrated in the drawings, but those skilled in the art will appreciate that various modifications can be made without departing from the spirit of the present invention. Other than the foregoing examples, the present invention relates to electronic apparatuses including a digital watch, a digital still camera, a touch panel, an electronic calculator, a TV, a projector, video tape recorders of viewfinder type and monitor direct view type, an automobile navigation system, a pager, an electronic notebook, a word processor, a workstation, a videophone, a POS terminal. The electrooptical device according to the present invention can be used as a display of these electronic apparatuses.

Advantages

As described above, according to the present invention, the color of the transmissive display or the reflective display can be easily tuned at low cost. Also, the difference in the perceived color between the reflective display and the transmissive display can be reduced, and, in particular, the chroma of the transmissive display can be improved.

The entire disclosure of Japanese Patent Application Nos. 2001-296480 filed Sep. 27, 2001 and 2002-217915 filed Jul. 26, 2002 are incorporated by reference herein.

What is claimed is:

1. An electrooptical device comprising:
a pixel;
a coloring layer including a hypochromic portion and a hyperchromic portion, the hyperchromic portion having a higher light density than the hypochromic portion; and
a reflective layer disposed in the pixel,
wherein the hypochromic portion overlaps the reflective layer and the hyperchromic portion overlaps an area that the reflective layer is not disposed, and
wherein a part of the hypochromic portion overlaps the area.

2. The electrooptical device according to claim 1, wherein at least one part of the hypochromic portion overlaps at least one part of the hyperchromic portion.

3. The electrooptical device according to claim 1 further comprising:
a first substrate;
a second substrate opposite the first substrate; and
an electrooptical layer between the first substrate and the second substrate, the reflective layer being disposed between the electrooptical layer and the first substrate, and the coloring layer being disposed between the electrooptical layer and the second substrate.

4. The electrooptical device according to claim 3, wherein at least one part of the hypochromic portion overlaps at least one part of the hyperchromic portion.

5. The electrooptical device according to claim 1 further comprising:
a first substrate;
a second substrate opposite the first substrate; and
an electrooptical layer between the first substrate and the second substrate, the hyperchromic portion being disposed between the electrooptical layer and the first substrate, and the hypochromic layer being disposed between the electrooptical layer and the second substrate.

6. The electrooptical device according to claim 5, wherein at least one part of the hypochromic layer overlaps at least one part of the hyperchromic layer.

7. An electronic apparatus comprising the electrooptical device according to claim 1.

* * * * *